US010223417B1

(12) United States Patent
Sirin et al.

(10) Patent No.: US 10,223,417 B1
(45) Date of Patent: Mar. 5, 2019

(54) SYSTEM AND METHOD FOR REDUCING QUERY-RELATED RESOURCE USAGE IN A DATA RETRIEVAL PROCESS

(71) Applicant: Stardog Union, Arlington, VA (US)

(72) Inventors: Evren Sirin, Arlington, MA (US); Michael Howard Grove, Ellicott City, MD (US); Kendall Grant Clark, Great Falls, VA (US); Jess M. Balint, Madison, WI (US)

(73) Assignee: STARDOG UNION, Arlington, VA (US)

( * ) Notice: Subject to any disclaimer, the term of this patent is extended or adjusted under 35 U.S.C. 154(b) by 0 days.

(21) Appl. No.: 16/007,850

(22) Filed: Jun. 13, 2018

(51) Int. Cl.
*G06F 17/30* (2006.01)
*G06N 3/08* (2006.01)
(52) U.S. Cl.
CPC .. *G06F 17/30454* (2013.01); *G06F 17/30463* (2013.01); *G06N 3/08* (2013.01)
(58) Field of Classification Search
None
See application file for complete search history.

(56) References Cited

U.S. PATENT DOCUMENTS 5,659,725 A * 8/1997 Levy ............... G06F 17/30454
6,990,484 B1 * 1/2006 Ghazal ............ G06F 17/30454
707/723
2009/0125766 A1 * 5/2009 Safarpour .......... G06F 17/504
714/724
2018/0246848 A1 * 8/2018 Douglass ............ G06F 15/803
2018/0276417 A1 * 9/2018 Cerezo Sanchez ....... G06F 8/41
2018/0300181 A1 * 10/2018 Hetzel ................ G06F 9/5055

OTHER PUBLICATIONS

Barrett, CS357: From SAT to SMT: The DPLL(T) Architecture Oct. 19, 2015, NYU, https://web.stanford.edu/class/cs357/lectures/lec9.pdf.*
Beanes et al., QEX: Symbolic SQL Query Explorer Feb. 16, Microsoft Research, https://www.microsoft.com/en-us/research/wp-content/uploads/2016/02/qex.pdf.*
(Continued)

*Primary Examiner* — Jason G Liao
(74) *Attorney, Agent, or Firm* — Pillsbury Winthrop Shaw Pittman LLP

(57) ABSTRACT

In certain embodiments, query-related resource usage in a data retrieval process may be reduced. In some embodiments, a graph query related to a data request may be obtained. The graph query may be transformed into a query set based on a graph data model and patterns of the graph query. Upon generation, the query set may include queries and query operators linking the queries, where the query operators include a first query operator linking first and second queries of the queries or other query operators. Prior to execution of the first and second queries, a satisfiability issue may be predicted, where the satisfiability issue is related to combining results derived from the first and second queries. Based on the prediction, the first query operator may be removed from the query set to update the query set. The updated query set may be executed to satisfy the graph query.

20 Claims, 14 Drawing Sheets

(56) References Cited

OTHER PUBLICATIONS

Levy et al., Equivalence, Query-Reachability, and Satisfiability in Datalog Extensions May 28, 1993, PODS '93 Proceedings of the twelfth ACM SIGACT-SIGMOD-SIGART symposium on Principles of database systems, pp. 109-122.*

Shkapsky et al., Graph Queries in a Next-Generation Datalog System 2013, Proceedings of the VLDB Endowment, vol. 6, No. 12, pp. 1258-1261.*

Chaudhuri et al., SAT-based compilation to a non-vonNeumann processor Nov. 16, 2017, ICCAD, 675-82.*

* cited by examiner

```
INSERT {
  graph spa:model {
    :myModel a spa:ClassificationModel ;
           spa:arguments (?director ?actor ?keyword) ;
           spa:predict ?similar .

}
}

WHERE {
  ?movie :director ?director ;
         :actor ?actor ;
         :keyword ?keyword ;
         :similar ?similar .
}
```

```
SELECT ?similar ?confidence
WHERE { graph spa:model {
   :myModel spa:arguments (?director ?actor ?keyword) ;
          spa:confidence ?confidence ;
          spa:predict ?similar .
 }
   :movie5:director ?director ;
          :actor ?actor ;
          :keyword ?keyword .
}
```

| similarity | value    |
|------------|----------|
| Movie 6    | 0.323291 |
| Movie 7    | 0.290015 |
| Movie 8    | 0.159687 |

FIG. 10

SYSTEM AND METHOD FOR REDUCING QUERY-RELATED RESOURCE USAGE IN A DATA RETRIEVAL PROCESS

CROSS-REFERENCE TO RELATED APPLICATIONS

This application is related to the following applications, filed on even date herewith: (1) U.S. patent application Ser. No. 16/007,639, entitled "System and Method for Reducing Data Retrieval Delays via Prediction-Based Generation of Data Subgraphs;" and (2) U.S. patent application Ser. No. 16/007,911, entitled "System and Method for Providing Prediction-Model-Based Generation of a Graph Data Model," each of which is hereby incorporated by reference herein in its entirety.

FIELD OF THE INVENTION

The invention relates to facilitating multi-source-type interoperability and information retrieval optimization.

BACKGROUND OF THE INVENTION

As an organization grows, the number of data silos existing within the organization generally increases, creating many repositories of fixed data that is "unconnected" to the rest of the organization. Such data silos often exist because the data format or data source technologies fail to match a previous or current standard. Large enterprises, for example, often have inherited and legacy data systems that are incompatible with one another or incompatible with new data systems. Although data migration systems can be used to transfer data from different data storage types, formats, or IT systems into one data system matching a current standard, such large scale data migration processes typically require substantial overhead (e.g., computational resources, time, etc.) and cause significant disruptions to other organizational activities. These and other drawbacks exist.

SUMMARY OF THE INVENTION

Aspects of the invention relate to methods, apparatuses, or systems for facilitating multi-source-type interoperability and information retrieval optimization, such as the use of data conversion models to facilitate a multi-source-type query to multiple data sources of different data source types, the use of prediction models to generate data conversion models, the use of prediction models to store transformed data in temporary data storage in anticipation of requests for such data, the optimization of query sets derived from a data request to reduce query-related resource usage in a data retrieval process, etc.

In some embodiments, query-related resource usage in a data retrieval process may be reduced. As an example, a graph query related to a data request may be obtained. The graph query may be transformed into a query set based on a graph data model and patterns of the graph query. Upon generation, the query set may include queries and query operators linking the queries, where the query operators include a first query operator linking first and second queries of the queries or other query operators. Prior to execution of the first and second queries, a satisfiability issue may be predicted, where the satisfiability issue is related to combining results derived from the first and second queries. Based on the prediction, the first query operator may be removed from the query set to update the query set. The updated query set may be executed to satisfy the graph query.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 10 illustrates an example of code determining similarity between nodes of a graph, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
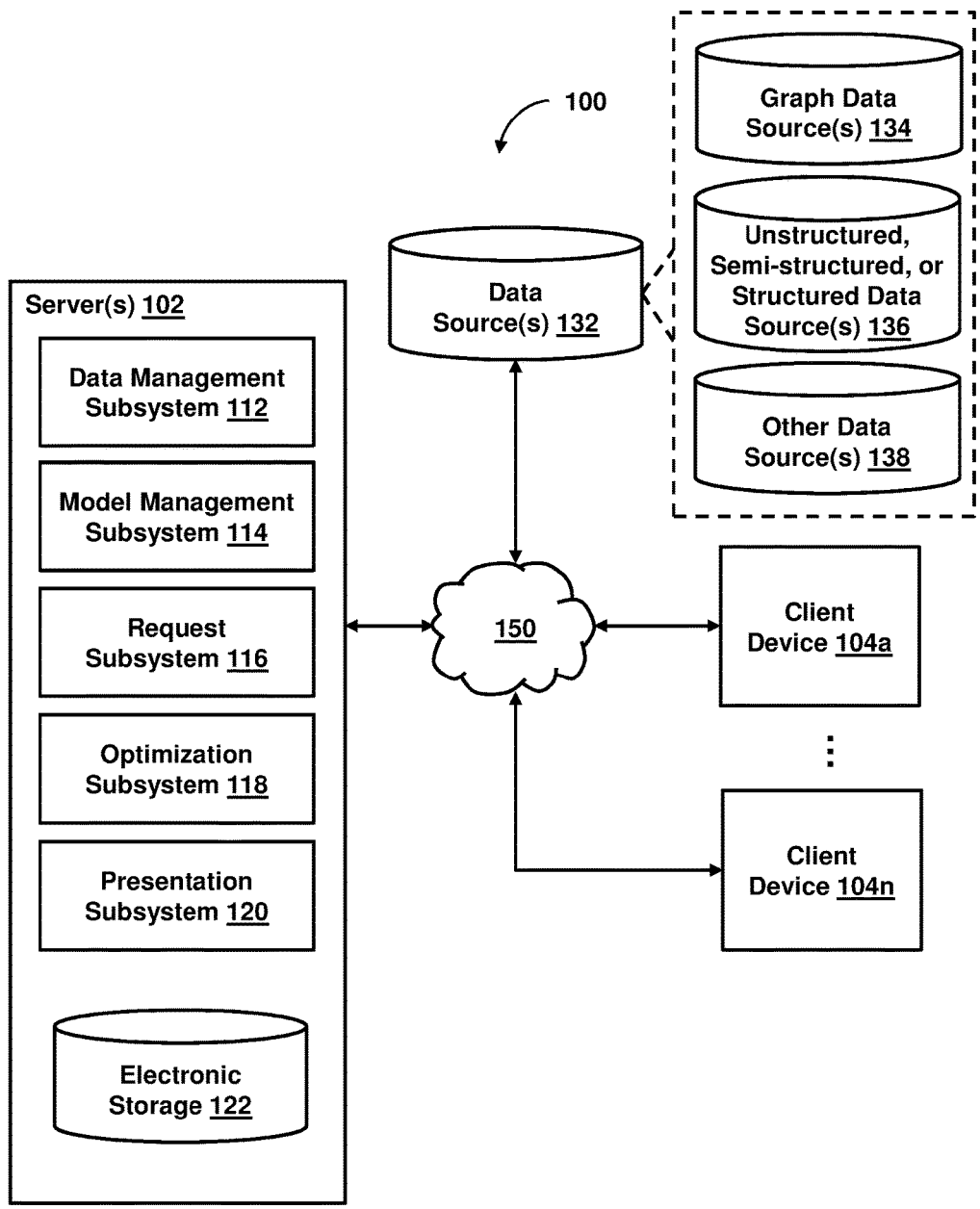
FIG. 1 illustrates a system for facilitating multi-source-type interoperability and information retrieval optimization, in accordance with one or more embodiments.

FIG. 1 shows a system 100 for facilitating multi-source-type interoperability and information retrieval optimization, in accordance with one or more embodiments. As shown in FIG. 1, system 100 may include server(s) 102, client devices 104a-104n, data source(s) 132, or other components. Server 102 may include data management subsystem 112, model management sub system 114, request sub system 116, optimization sub system 118, presentation sub system 120, electronic storage 122, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers 102, or other components of system 100. Data sources 132 may include graph data sources 134, unstructured (e.g., typewritten documents), semi-structured (e.g., XML documents, emails, etc.), or structured (e.g., relational database management system (RDBMS) information, lightweight directory access protocol (LDAP) information, etc.) data sources 136, and other data sources 138. The data sources may include various databases or other sources of data. In some embodiments, a single database may include one or more data sources 132. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104.

Figure 2:
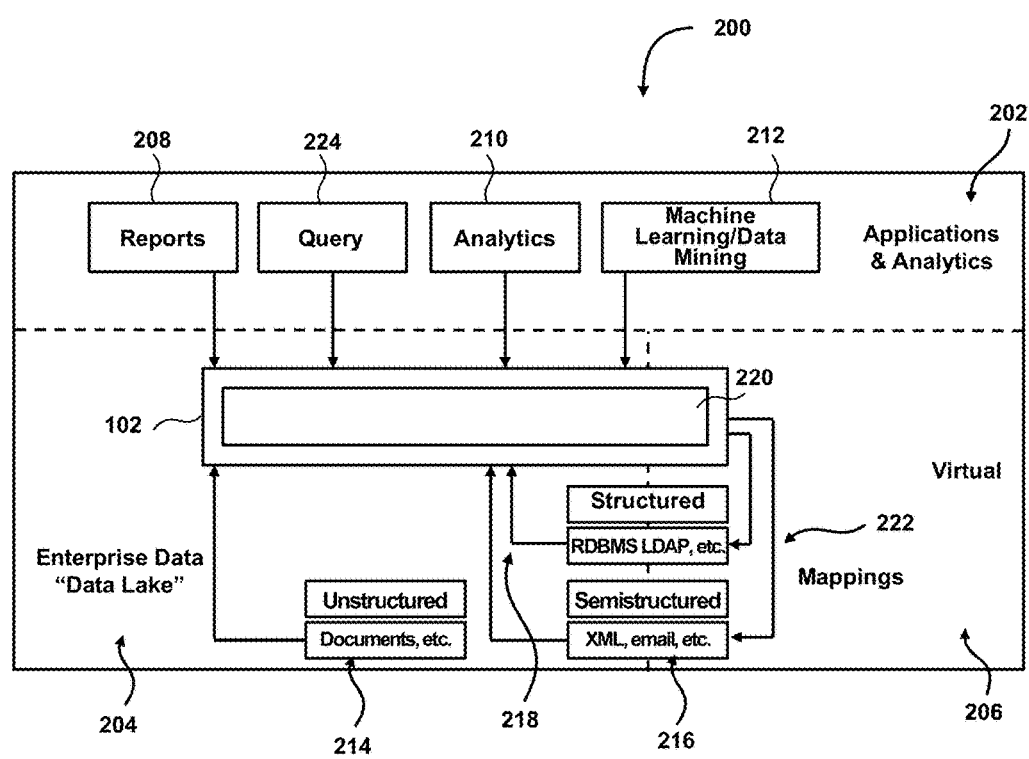
FIG. 2 illustrates an enterprise environment that includes one or more components of the system, in accordance with one or more embodiments.

In some embodiments, with respect to FIG. 2, enterprise environment 200 may be an environment for one or more components of system 100. Enterprise environment 200 may include an applications and analytics portion 202, an enterprise "data lake" portion 204, a virtual portion 206, or other portions. Server 102 may be configured to receive various types of information such as reports 208, analytics 210, machine-learned or data-mined information 212, unstructured information 214 (e.g., typewritten documents), semi-structured information 216 (e.g., XML documents, emails, etc.), structured information 218 (e.g., RDBMS information, LDAP information, etc.), or other information. Server 102 may receive such information from one or more client devices 104, for example, running various applications or analytics operations, or from other sources.

Figure 3:
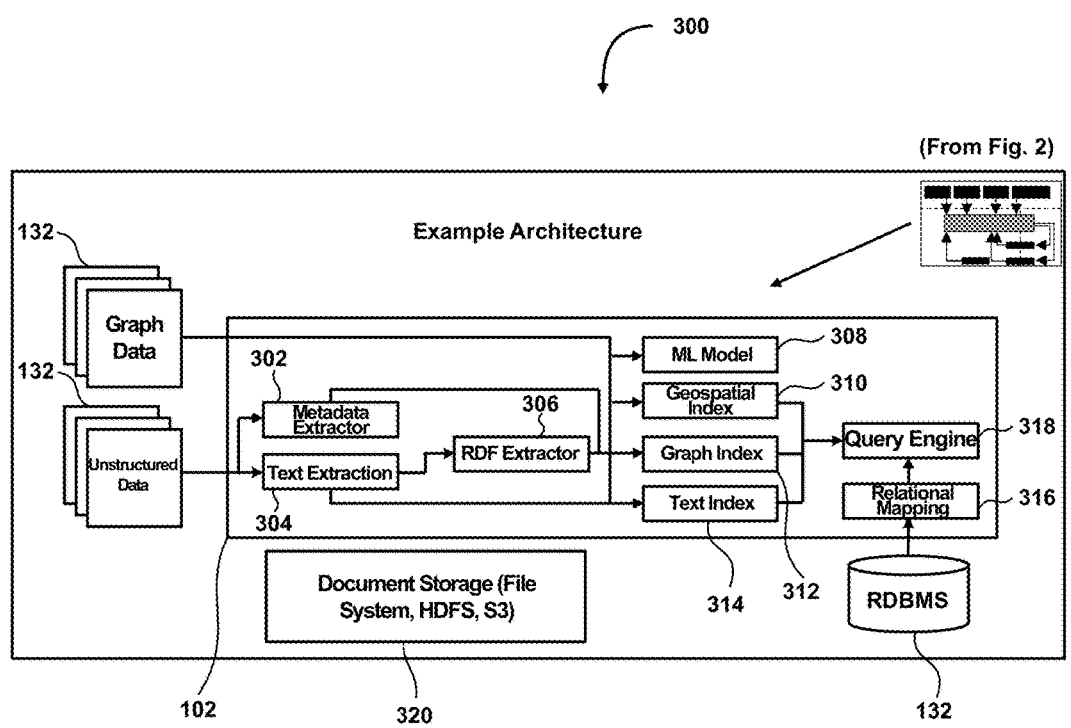
FIG. 3 illustrates an example architecture of one or more components of the system, in accordance with one or more embodiments

In some embodiments, with respect to FIG. 3, architecture 300 may be an architecture for one or more components of system 100. As shown in FIG. 3, server 102 may include a metadata extractor 302, a text extractor 304, a graph extractor 306 (e.g., a resource description framework (RDF) extractor), a machine learning component 308, a geospatial index 310, a graph index 312, a text index 314, a relational mapping component 316, a query engine 318, or other components. In some embodiments, one or more of these components may be, be included in, or perform operations associated with, the one or more of the server components shown in FIG. 1 and described herein. For example, metadata extractor 302, text extractor 304, graph extractor 306, or other components may be, or be included in data management subsystem 112 shown in FIG. 1. Machine learning component 308 may be, or be included in model management subsystem 114 shown in FIG. 1. Geospatial index 310, graph index 312, text index 314, relational mapping component 316, query engine 318, or other components may be, or be included in model management subsystem 114, request subsystem 116, or optimization subsystem 118 shown in FIG. 1, or other subsystems. In some embodiments, server 102 is associated with a document storage system 320.

In some embodiments, with respect to FIG. 3, server 102 may receive graph data, unstructured data, information from a relational database management system, or data from other sources 134. As described herein, the components of server 102 (e.g., query engine 318) may perform one or more queries to obtain relevant results. Based on templates generated by the system, or other information (e.g., information from geospatial index 310, graph index 312, text index 314, relational mapping component 316), server 102 may convert data representations obtained from the queries into a graph form (or other form) via one or more data conversion models, as described herein elsewhere.

In some embodiments, system 100 may facilitate multi-source-type interoperability among different data source technologies or standards via the generation of a data conversion model or other data model, which are configured to convert data representations of one data source into data representations compatible with another data source (or vice versa). In some embodiments, system 100 may utilize such data conversion models to facilitate a multi-source-type query to multiple data sources of different data source types by using the data conversion models to convert non-compatible query results (e.g., of different data source types) into a set of results compatible with a target data source. In this way, for example, system 100 may obviate the need for a company or other entity to overhaul its legacy or current databases in favor of new or different data source technologies or standards. In one use case, system 100 may provide on-the-fly conversions of data representations from one or more data sources of different data source types via one or more such data conversion models.

In some embodiments, system 100 may obtain one or more templates for converting data representations of a first data source type (e.g., a relational model type or other data source type) into data representations of a second data source type (e.g., a graphical model type or other data source type), and create or modify a data conversion model based on the obtained templates. As an example, the templates may include instructions for converting of data characteristics corresponding to the first data source type (e.g., row or column attributes and values specific to a particular SQL data source or other data source) to data characteristics corresponding to the second data source (e.g., graph attributes and values specific to a graph data source or other data source). As a further example, system 100 may process the templates to determine patterns (e.g., regular expressions or other patterns) or rules (associated with the templates) for matching a data representation of the first data source type to at least one of the templates that can be used to convert the non-graph data representation to a data representation of the second data source type. System 100 may then generate the data conversion model to incorporate the patterns, rules, or other modeling information as part of the data conversion model (e.g., such that the data conversion model includes or indicates such templates, its patterns or rules, etc.). In some embodiments, system 100 may utilize one or more prediction models (e.g., neural networks or other machine learning models) to generate one or more graph data models configured to convert data representations (not compatible with a particular graph database) into graph data representations compatible with the graph database or to generate one or more other data conversion models, as described herein elsewhere.

In some embodiments, system 100 may facilitate reduction of delay for providing a sufficient response to a request or improve efficiency of temporary data storage or other computer resource usage. System 100 may facilitate reduction of delay or improve efficiency, for example, via prediction of requests and temporary storage of query results related to the predicted requests in graph form, via selective obtainment or temporary storage of subsets of the query results related to the predicted requests, via query set optimization, or other techniques. As an example, a request for query results may be predicted, a subset of results may be obtained responsive to the request prediction, and the subset of results may be stored at a server cache, a web cache, memory cache, or other temporary data storage (e.g., electronic storage 122). The subset of results may be converted into one or more sub-graphs (e.g., if the results are not in a suitable graph form), and the sub-graphs may be stored in the temporary data storage. When the predicted request (or a future request matching the predicted request) does occur, one or more of the subgraphs may be obtained from the temporary data storage (e.g., in lieu of having to obtain, and possibly convert from non-graph form to graph form, the subset of results through other data storage with significantly greater delay) and used to respond to the occurred predicted request. In this way, for example, the temporary storage of results in their converted form (prior to particular requests occurring) may significantly decrease latency or other delays for sufficiently responding to requests.

In some embodiments, system 100 may reduce query-related resource usage in a data retrieval process by optimizing a query set derived from a data request, such as a query set into which a graph query (or other query related to the data request) is transformed. In some embodiments, such query set optimizations may include removal of a query operator linking multiple queries from a query set, merging of multiple queries of a query set into a single query, removal of one or more queries from a query set, or other optimizations. Such optimizations may be performed based on a prediction of one or more satisfiability issues (e.g., related to combining results derived from certain queries), incompatibility issues, or other issues to avoid or mitigate such issues or negative impacts of such issues. In some embodiments, in response to obtaining a graph query related to a data request, system 100 may transform the graph query to a query set having multiple queries and query operators linking the queries (e.g., unions, joins, or other query operators). Based on a prediction of a satisfiability issue (related to combining results derived from two of the queries), system 100 may remove a query operator that links the two queries from the query set or perform other optimizations on the query set to update the query set. As such, when system 100 executes the updated query set to satisfy the graph query (and, thus, the data request), system 100 may avoid or mitigate the satisfiability issue or the negative impacts of the satisfiability issue, such as (i) the waste of resources used to execute one or more portions of the query set and attempting to combine incompatible results derived from such query set execution, (ii) the delay resulting from such execution and attempts, or (iii) other negative impacts.

In some embodiments, system 100 may facilitate prediction-model-based (i) generation of data models (e.g., data conversion models, graph data models, etc.), (ii) obtainment or storage of results related to future requests or other information, (iii) generation or performance of queries, (iv) query set optimization, or (v) other operations. The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, system 100 may obtain (i) modeling information related to data models (e.g., templates, its patterns or rules, or other information related to data conversion models, graph data models, etc.), (ii) graph information related to nodes or edges of a graph or other information related to data points or relationships of other data sources, (iii) query information (e.g., graph queries, SQL or other non-graph queries, query sets derived from the graph queries or the non-graph queries, etc.), (iv) optimization or issue information (e.g., information indicating query set optimization logic or other optimizations, information indicating potential issues related to combining results of particular queries, etc.), or other training information (e.g., unstructured documents, semi-structured documents, structured documents, or other information). System 100 may cause one or more prediction models to be trained based on the training information to generate (i) one or more data models, graphs or other data structures, query sets, or other information or (ii) one or more predictions related thereto such as predicted patterns, rules, templates, optimization logic, satisfiability issues, graph node or edge attributes/values or other attributes/values, etc. As an example, the number of information items (e.g., patterns, rules, templates, graphs, query sets, or other training information items) used to train the prediction models may be 500 or more information items, 1000 or more information items, 10000 or more information items, 100000 or more information items, 1000000 or more information items, or other number of information items.

Data Model and Data Generation

In some embodiments, model management subsystem 114 may be configured to (i) generate one or more data models (e.g., data conversion models, graph data models, etc.) or information related thereto, (ii) predict patterns, rules, templates, or other modeling information for such data models, or (iii) perform other options. In some embodiments, model management subsystem 114 may obtain one or more templates for converting data representations of a first data source type (e.g., a relational model type or other data source type) into data representations of a second data source type (e.g., a graphical model type or other data source type), and create or modify a data conversion model based on the obtained templates. As an example, the templates may include instructions for converting data characteristics corresponding to the first data source type (e.g., row or column attributes and values specific to a particular SQL data source or other data source) to data characteristics corresponding to the second data source (e.g., graph attributes and values specific to a graph data source or other data source). As a further example, model management subsystem may process the templates to determine patterns (e.g., regular expressions or other patterns) or rules (associated with the templates) for matching a data representation of the first data source type to at least one of the templates that can be used to convert the data representation of the first data source type to a data representation of the second data source type. Model management subsystem 114 may then generate the data conversion model to incorporate the patterns, rules, or other modeling information as part of the data conversion model.

Figure 4:
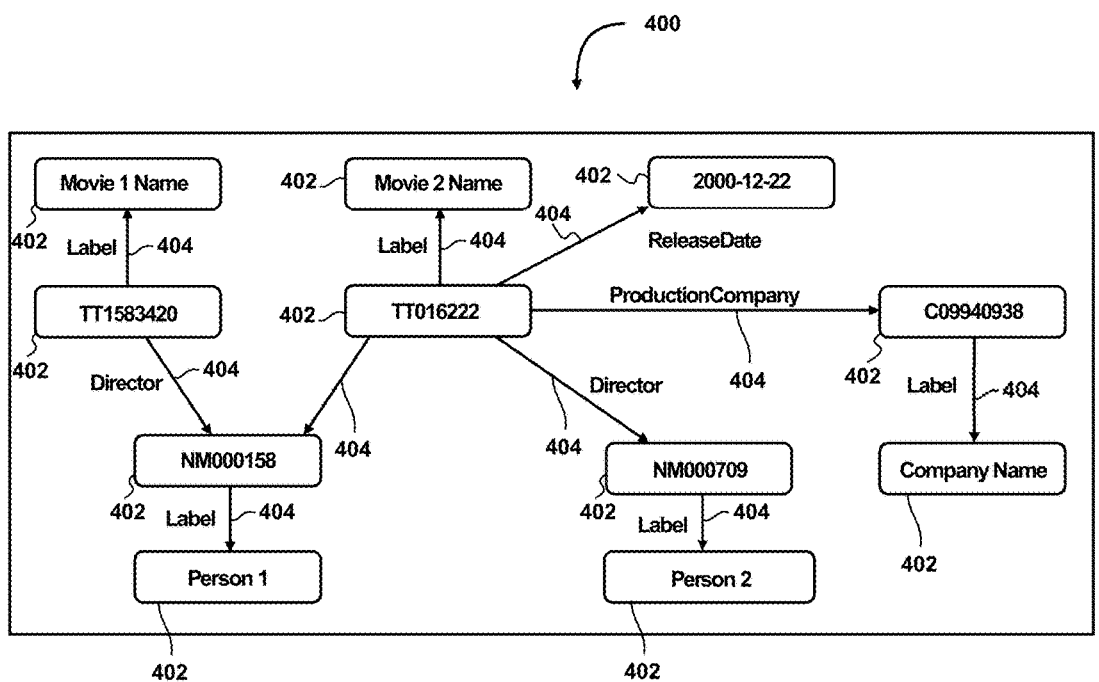
FIG. 4 illustrates an example of a graph in a graph database, in accordance with one or more embodiments.

As an example, with respect to FIG. 4, non-graph data representations (e.g., table fields, rows or columns of a table, etc.) may be converted into graph data representations such as those in graph 400 (e.g., nodes or edges of graph 400), which includes graph data representations related to motion pictures. As shown in FIG. 4, graph 400 includes various nodes 402 and edges 404 connecting nodes 402. In this example, two different motion picture nodes 402 corresponding to two different motion pictures TT1583420 and TT016222 are connected to label nodes 402 (e.g., Movie Name 1 and Movie Name 2) for the motion pictures, director nodes NM000158 and NM000709, a production company node C09940938, and a release date node 2000 Dec. 22. These connections are illustrated with the various edges 404 between individual nodes 402. Director nodes NM000158 and NM000709, and production company node C09940938, are also connected to corresponding label nodes 402 (e.g., Person 1, Person 2, and Company Name) by edges 404.

Figure 5:
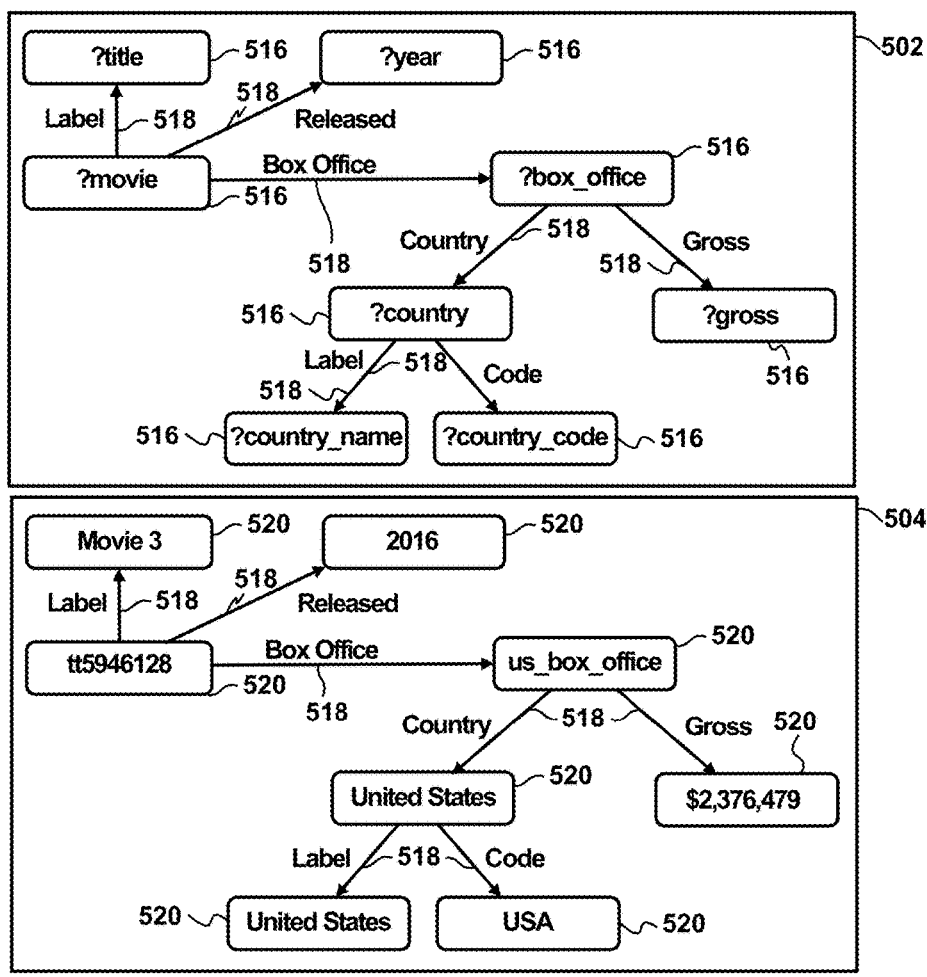
FIG. 5 illustrates data representations not compatible with a graph database, a template for converting the non-compatible data representations to graph data representations compatible with the graph database, and graph data representations derived from the non-compatible data representations, in accordance with one or more embodiments.

As a further example, with respect to FIG. 5, non-graph data representations in table 500 (e.g., from a SQL or other relational database) may be converted into graph data representations of graph 504 using template 502 (or templates 502). As indicated in FIG. 5, template 502 may include instructions for converting rows or columns (e.g., of table 500) to graph nodes or edges (e.g., of resulting graph 504) (or vice versa, in some embodiments). In this example, table 500 includes information for two movies titled Movie 3 and Movie 4, such as identification codes 506, titles 507, release years 508, box office country names 510, country codes 512, and gross earnings 514. Template 502 (which is shown in FIG. 5 in a graphical form) includes "placeholder" nodes 516 for a movie title, an identification code, a release year, a box office, a box office country, a box office country label, a box office country code, and gross earnings in that country. Nodes 516 are linked by corresponding edges 518, which indicate the relationships between such nodes 516. Based on the instructions of template 502 (e.g., nodes 516), non-graph data representations of table 500 for Movie 3 are converted into graph data representations (e.g. nodes 520) of graph 504 illustrates nodes 520.

Returning to FIG. 1, data management subsystem 112 may be configured to (i) generate one or more graphs or other data structures (e.g., SQL data structures, other non-graph data structures, etc.), (ii) predict information for nodes, edges, or other portions of such data structures, or (iii) perform other options. In some embodiments, data management subsystem 112 may utilize one or more graph data models to create or modify a graph from non-graph data representations (e.g., stored in SQL tables or other data sources). As an example, data management subsystem 112 may use a graph data model to convert non-graph data representations into graph representations (e.g., compatible with a particular graph database) to create a new graph or to supplement/modify an existing graph in the graph database.

In some embodiments, for one or more graphs, request subsystem 116 may generate one or more path queries for finding one or more paths between nodes of a graph (e.g., to determine all paths between two graph nodes, to determine the shortest path between two graph nodes or a predetermined number of the most shortest paths between the two graph nodes, etc.). In some embodiments, request subsystem 116 may generate the path queries to include restrictive parameters for the paths that such path queries will return. As an example, one such path query may restrict the results to paths associated with transactions greater than a specified monetary amount (e.g., all nodes or edges in the shortest path must be associated with transactions greater than $10K or other specified monetary amount). As another example, a path query may restrict the results to paths associated with a lifecycle (e.g., product life cycle, animal life cycle, document life cycle, etc.). As yet another example, a path query may restrict the results to paths from a movie node to nodes representing the production company and its parent companies (e.g., the movie Hitchcock is produced by Fox Searchlight Pictures which is owned by Fox Studios which is owned by 21st Century Fox). In some embodiments, request subsystem 116 may determine a query plan to respond to a data request based on such paths returned by such path queries. As an example, based on such path information, request subsystem 116 may determine one or more queries to handle a data request (e.g., obtained from a user device or predicted as described herein), determine which graphs or graph databases are to be target sources for handling the data request, determining costs associated with such target sources, etc. Request subsystem 116 may then create or select a query plan for the data request based on such determinations (e.g., by incorporating the target sources in the query plan, prioritizing the queries or target sources based on the cost information, etc.).

In some embodiments, prediction models (e.g., neural networks, other machine learning models, or other prediction models) may be utilized to facilitate the generation of graph data models or other data models, the generation of graphs or other data structures, the prediction of information for such data models or data structures, the determination of query plans, or other operations. Training data used to train the prediction models may include (i) inputs to be provided to a prediction model (e.g., inputs provided to and processed by other prediction models or other inputs), (ii) reference outputs that are to be derived from a prediction model's processing of such inputs (e.g., user-confirmed or user-provided outputs, outputs confirmed through one or more prediction models' processing of such inputs, outputs confirmed multiple times by processing of such inputs by respective sets of prediction models, or other reference outputs), (iii) reference indications of outputs that are not to be derived from a prediction model's processing of such inputs (e.g., user indications that such outputs are inaccurate or other reference indications), or (iv) other training data.

In some embodiments, model management subsystem 114 may obtain modeling information related to a graph data model set (that includes one or more graph data models), a collection of data representations for each of the graph data models to convert into graph data representations (e.g., compatible with a particular graph database), or other information. Model management subsystem 114 may provide the modeling information, the collections of data representations, or other information to a prediction model to train the prediction model.

As an example, the modeling information may include (i) templates for converting data representations (e.g., non-graph data representations or other data representations not compatible with a given graph database) to graph data representations compatible with the graph database, (2) patterns or rules (associated with the templates) for matching a non-compatible data representation to at least one of the templates that can be used to convert the non-compatible data representation to a compatible graph data representation, or (3) other modeling information. For each graph data model of the graph data model set and the non-compatible data representations (that the graph data model is configured to convert), model management subsystem 114 may provide one or more templates of the graph data model's templates and the non-compatible data representations to the prediction model for the prediction model to predict one or more additional templates of the graph data model's templates. In one use case, for example, even where such additional templates already exist as part of the graph data model, the prediction model may be caused to predict the additional templates as part of the training of the prediction model. Thus, in one use case, the prediction model may predict the additional templates without reliance on the additional templates (e.g., without reliance on at least some of the additional templates, without reliance on any of the additional templates, etc.).

As a further example, for each graph data model of the graph data model set, model management subsystem 114 may provide the additional templates of the graph data model's templates to the prediction model as reference feedback for the prediction model's prediction of the additional templates to train the prediction model. The prediction model may use the additional templates as "reference templates" to assess its prediction of the additional templates (e.g., templates generated by the prediction model based on other templates provided as input to the prediction model). Based on its assessment of its prediction, the prediction model may update one or more portions of the prediction model (e.g., by adjusting weights of the prediction model's parameters or other portions of the prediction model in accordance with whether its prediction was accurate or how accurate its prediction was). In one use case, where the prediction model is a neural network, the neural network may update one or more layers of the neural network based on the neural network's assessment of its prediction of the additional templates. As an example, the neural network may use forward or back propagation techniques to reset or modify weights of neural units in one or more layers (e.g., hidden layers between the input and output layers of the neural network or other layers of the neural network) based on the accuracy of its prediction (e.g., whether or how accurate its prediction of one or more of the additional templates was).

In some embodiments, upon a prediction model being trained (or updated based on such training), model management subsystem 114 may use the prediction model to generate a graph data model. As an example, model management subsystem 114 may cause the prediction model to generate the graph data model or information usable to generate the graph data model (e.g., templates, patterns, rules, or other information for generating the graph data model). As a further example, with respect to converting non-graph data representations into graph data representations, model management subsystem 114 may provide a collection of non-graph data representations from a non-graph database as input to the prediction model. Responsive to such input, the prediction model may output one or more templates, patterns, rules, or other information for the graph data model. Model management subsystem 114 may use the templates, its patterns or rules, or other information to generate the graph data model such that the graph data model is configured for converting the non-graph data representations (from the non-graph database) into graph data representations compatible with a graph database.

In some embodiments, data management subsystem 112 may utilize one or more prediction models to predict information for nodes, edges, or other data representations to generate a graph or other data structure, such as creating the data structure, modifying one or more portions of the data structure, or supplementing the data structure based on the predicted information for the nodes, edges, or other data representations. In some embodiments, data management subsystem 112 may obtain graph information related to nodes or edges of a graph or other information related to data points or relationships of other data sources, and provide the graph information or other such information to a prediction model to train the prediction model to predict information for additional or replacement nodes, edges, or other data representations (e.g., to create a new graph or other data structure, to modify an existing graph or other data structure, to supplement an existing graph or other data structure, etc.).

In some embodiments, data management subsystem 112 may obtain one or more data representation sets and provide the data representation sets to a prediction model to train the prediction model. As an example, a data representation set may include nodes, edges, or other data representations, and, for each data representation set of the data representation sets, data management subsystem 112 may provide one or more nodes or edges of the data representation set as input to the prediction model for the prediction model to predict one or more additional nodes or edges of the data representation set. As used herein, providing nodes or edges may refer to providing data represented by the nodes or edges. In one use case, for example, even where such additional nodes or edges already exist as part of the data representation set (e.g., as part of an existing graph), the prediction model may be caused to predict the additional nodes or edges as part of the training of the prediction model. Thus, in one use case, the prediction model may predict the additional nodes or edges without reliance on the additional nodes or edges (e.g., without reliance on at least some of the additional nodes or edges, without reliance on any of the additional nodes or edges, etc.).

As a further example, for each data representation set of the data representation sets, data management subsystem 112 may provide the additional nodes or edges of the data representation set to the prediction model as reference feedback for the prediction model's prediction of the additional nodes or edges to train the prediction model. The prediction model may use the additional nodes or edges as "reference nodes or edges" to assess its prediction of the additional nodes or edges (e.g., nodes or edges generated by the prediction model based on other nodes or edges provided as input to the prediction model). Based on its assessment of its prediction, the prediction model may update one or more portions of the prediction model (e.g., by adjusting weights of the prediction model's parameters or other portions of the prediction model in accordance with whether its prediction was accurate or how accurate its prediction was). In one use case, where the prediction model is a neural network, the neural network may update one or more layers of the neural network based on the neural network's assessment of its prediction of the additional nodes or edges.

In some embodiments, upon a prediction model being trained (or updated based on such training), data management subsystem 112 may use the prediction model to create or modify data representations for a new or existing data structure. As an example, data management subsystem 112 may use the prediction model to create new nodes or edges for a new or existing graph, modify one or more nodes or edges of an existing graph, or perform other operations. In some embodiments, data management subsystem 112 may perform a traversal of a graph to process nodes or edges of the graph (e.g., by causing the prediction model to traverse the graph and process the nodes and edges as input during the traversal, by causing one or more agents to crawl the graph to extract the graph nodes during the traversal and providing the extracted nodes or edges as input to the prediction model, etc.). Responsive to obtaining such input resulting from the traversal, the prediction model may generate new nodes or edges for the graph (e.g., as additional nodes or edges for the graph, as replacement nodes or edges to replace existing nodes or edges in the graph, etc.).

In some embodiments, responsive to a prediction model's generation of a data representation (e.g., node, edge, or other data representation), data management subsystem 112 may automatically add the data representation to a graph or other data structure without a user input (i) subsequent to the generation of the data representation and (ii) indicating whether or not the data representation is to be added. As an example, data management subsystem 112 may add the data representation as a new data representation for the data structure, add the data representation as a replacement data representation for an existing data representation of the data structure, or otherwise modify the data structure based on the data representation.

On the other hand, in some embodiments, the addition of the new data representation to a graph or other data structure (or a determination not to add the new data representation) may be based on such a subsequent user input. As an example, a prediction model may generate a node or edge, and data management subsystem 112 may obtain a node or edge from the prediction model and provide a notification to a user regarding the node or edge. In one use case, the notification may involve a prompt to review the node or edge, a prompt to confirm or deny the use of the node or edge as a new or replacement node or edge for the graph, or other notification. Responsive to a user confirmation to add the node or edge (e.g., as a new node or edge, as a replacement node or edge, etc.), data management subsystem 112 may add the new or edge to the graph. Alternatively, responsive to a user declination with respect to adding the node or edge, data management subsystem 112 may determine not to add the new node or edge to the graph.

In some embodiments, data management subsystem 112 may provide an indication of the user confirmation or user declination as reference feedback regarding the prediction model's generation of the node or edge. The prediction model may use the reference feedback to assess its prediction of the node or edge. Based on its assessment of its prediction, the prediction model may update one or more portions of the prediction model (e.g., by adjusting weights of the prediction model's parameters or other portions of the prediction model in accordance with whether its prediction was accurate or how accurate its prediction was). In one use case, where the prediction model is a neural network, the neural network may update one or more layers of the neural network based on the neural network's assessment of its prediction of the additional nodes or edges.

Figure 6:
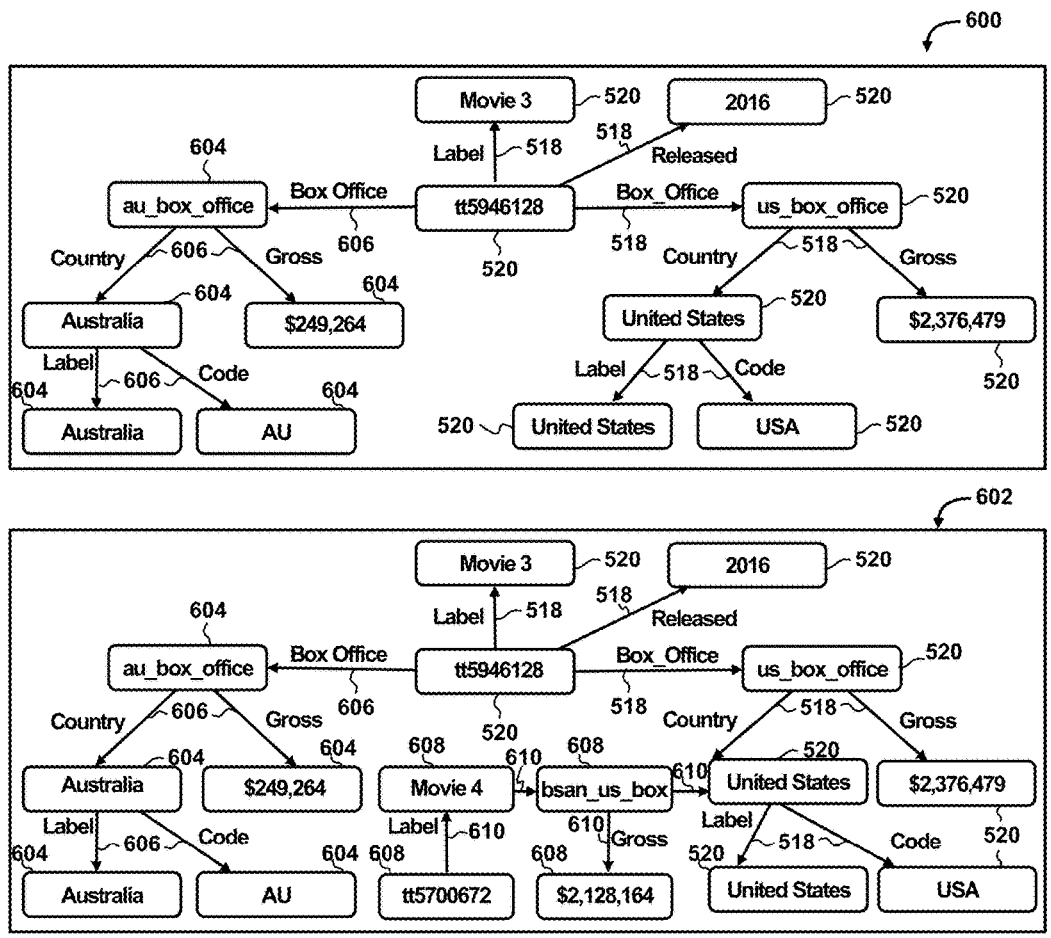
FIG. 6 illustrates examples of two different sets of graph data representations generated based on templates from a trained prediction model, in accordance with one or more embodiments.

Continuing with the information for Movie 3 and Movie 4 from FIG. 5, FIG. 6 shows examples of two different graph data representations 600 and 602 generated based on templates from the trained prediction model, in accordance with one or more embodiments. Graph data representations 600 and 602 may be roughly thought of as updates to graph data representation 504 from FIG. 5 generated because of additional training of the prediction model. Graph data representations 600 and 602 may be generated by data management subsystem 112 (FIG. 1) based on templates generated by the prediction model. For example, graph data representation 600 includes nodes 520 and edges 518 related to Movie 3 shown in graph data representation 504 from FIG. 5. Graph data representation 600 also includes nodes 604 and edges 606 related to an additional box office (e.g., the Australian box office) for Movie 3. The information associated with nodes 604 and edges 606 was included in data representation 500 from FIG. 5, but not in graph data representation 504. However, training of the prediction model may cause the prediction model to generate additional templates, and these additional templates may be used to generate additional graph data representations such as graph data representation 600.

Graph data representation 602 provides a further example. Graph data representation 602 includes nodes 520 and 604, and edges 518 and 606 related to Movie 3. Graph data representation 602 also includes nodes 608 and edges 610 related to Movie 4. Again here, the information associated with nodes 608, and edges 610 was included in data representation 500 from FIG. 5, but not in graph data representations 504 or 600. However, training of the prediction model may cause the prediction model to generate additional templates, and these additional templates may be used to generate additional graph data representations such as graph data representation 602.

Figure 7:
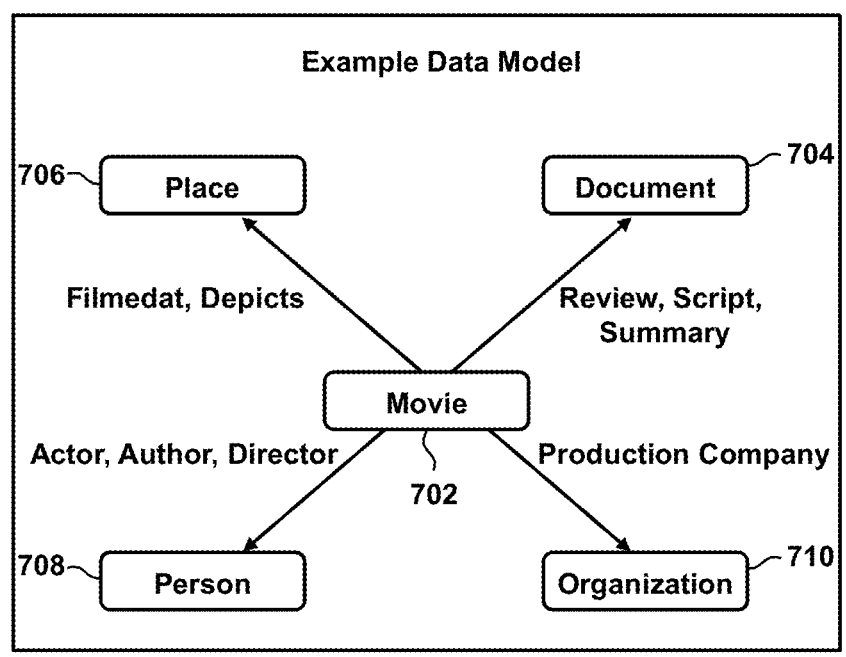
FIG. 7 illustrates an example of a graph data model, in accordance with one or more embodiments.

In one use case, with respect to FIG. 7, data model 700 is associated with a movie 702. Data model 700 includes a document node 704, a place node 706, a person node 708, and an organization node 710. Document node 704 may include or be associated with (e.g., via other edges and nodes not shown in data model 700) information, such as movie reviews, a movie script, a movie summary, or other information. Place node 706 may include or be associated with information such as a filming location, a location depicted in the movie, or other information. Person node 708 may include or be associated with actors in the movie, an author of the script, a director of the movie, or other information. Organization node 710 may include or be associated with a production company responsible for the movie, or other information. The graph data model 700 may be used to perform logic reasoning.

Figure 8:
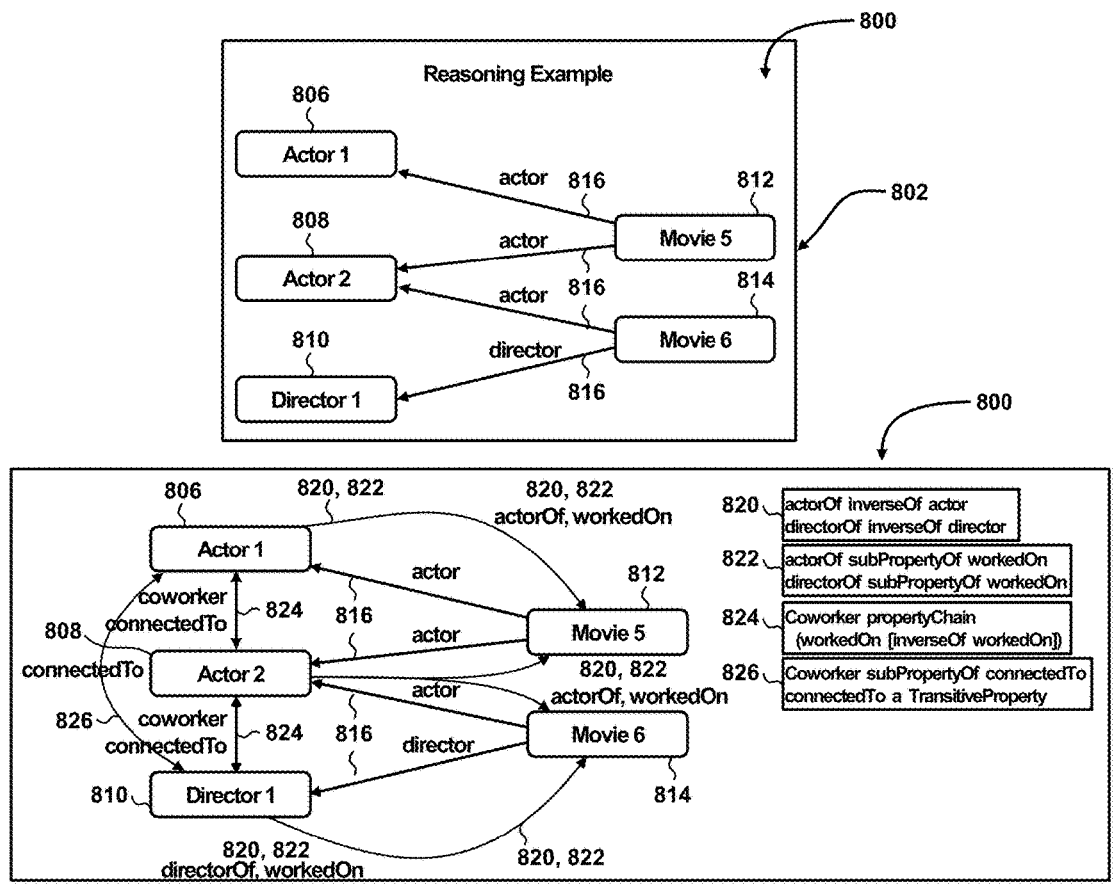
FIG. 8 illustrates an example of prediction model reasoning, in accordance with one or more embodiments.

In another use case, with respect to FIG. 8, a prediction model may be used to form data relationships via reasoning. At step 802, nodes 806, 808, and 810 for two different actors (Actor 1, Actor 2) and a director (Director 1), nodes 812 and 814 for two different movies (Movie 5, Movie 6), and corresponding edges 816 may be identified. At step 804, the prediction model may reason 820 that, inversely, if a movie incudes an actor, that actor is an actor of the movie. Phrased another way, if an edge 816 connects a movie to an actor, there must be an inverse edge 820 that connects the actor to the movie. Similar reasoning 820 applies for a director. In addition, the prediction model may reason 822 (and establish corresponding edges indicating) that the actor or director worked on the movie. Since the prediction model knows who worked on the movie, the prediction model may reason 824 (and establish corresponding edges indicating) that two people who worked on the same movie must be coworkers. Finally, step 804 illustrates how, since the prediction model has established relationships between coworkers, the prediction model may reason 826 (and establish corresponding edges indicating) that actors and directors are connected to each other through one or more coworkers.

Figure 9:
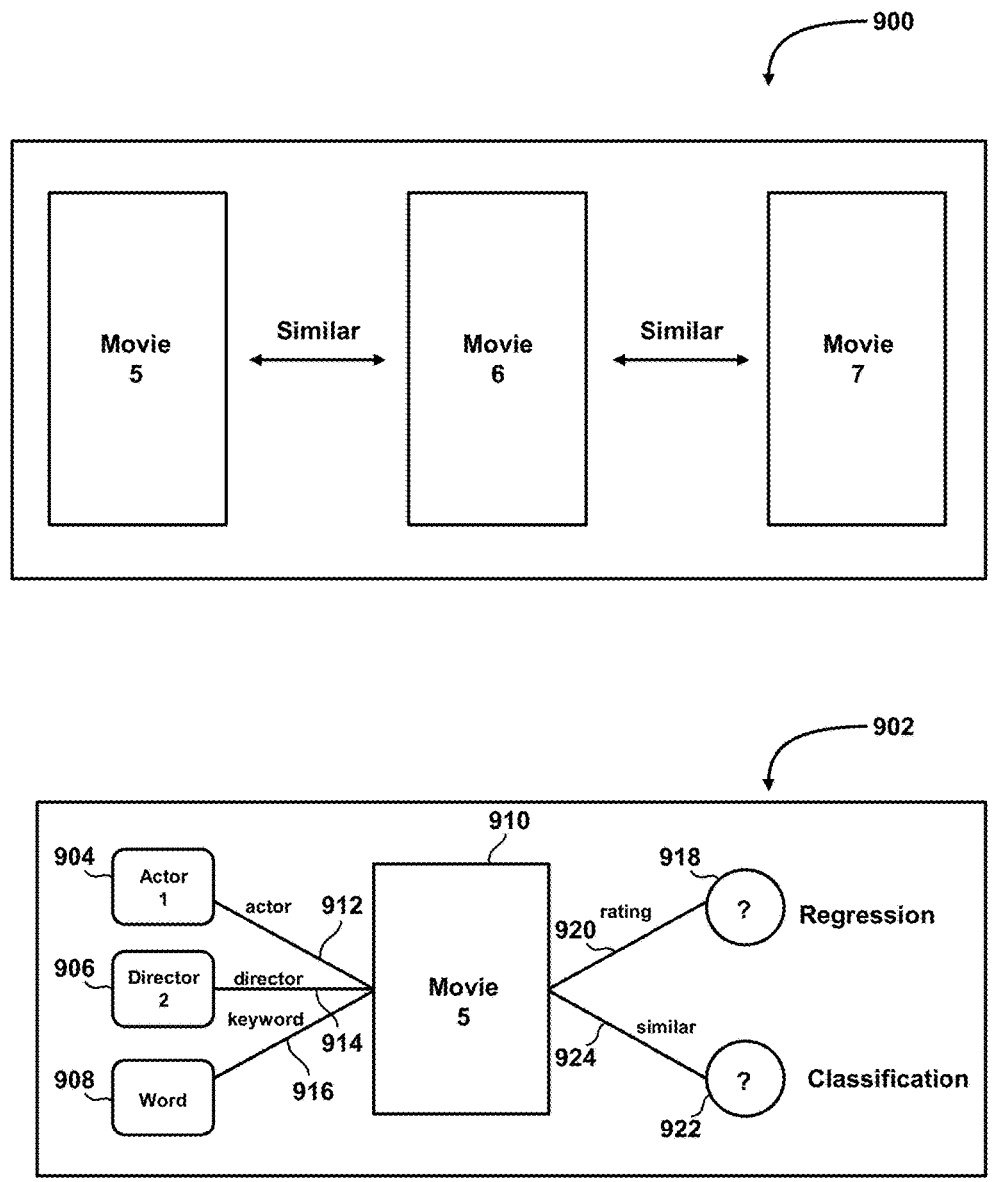
FIG. 9 illustrates an example of similarity predictions by a prediction model, in accordance with one or more embodiments.

In another use case, with respect to FIG. 9, data-model-based reasoning and/or supervised learning by the prediction model may allow the prediction model to predict which movies (in the examples used herein) are similar to each other. For example, a first view 900 of FIG. 9 illustrates Movie 5 and Movie 7, which are both similar to Movie 6. In some embodiments, as shown in a second view 902 of FIG. 9, the prediction model may be trained using supervised learning. As described above, a given node or edge from the prediction model may be added to a graph based on a user confirmation with respect to adding the given node or edge. An indication of the user confirmation may be provided to the prediction model by model management subsystem 114 (FIG. 1) as reference feedback regarding the prediction model's generation of the given node or edge. In some embodiments, a user declination with respect to adding the given node or edge may be obtained. Responsive to a user declination, the given node or edge may not be added to the graph. An indication of the user declination may be provided to the prediction model as reference feedback regarding the prediction model's generation of the given node or edge. As shown in view 902, nodes 904, 906, and 908 for Actor 1, Director 2, and a keyword are connected to a node 910 for Movie 5 by corresponding edges 912, 914, and 916. In some embodiments, the prediction model may be configured to propose a rating node 918 (connected via edge 920) for Movie 5 and a classification node 922 (connected via edge 924) for Movie 5 that may be confirmed or denied by a user.

In some embodiments, a similarity value or other measures of similarity between nodes may be determined. As an example, with respect to FIG. 10, programming code may be configured to determine a similarity value between nodes of a graph. In this example, the nodes correspond to Movies 5, 6, and 7 shown in FIG. 9. As shown in FIG. 10, a prediction may be used to predict that Movie 6 has a similarity value of 0.323291 relative to Movie 5, Movie 7 has a similarity value of 0.290015 relative to Movie 5, and Movie 8 has a similarity value of 0.159687 relative to Movie 5.

Figure 11:
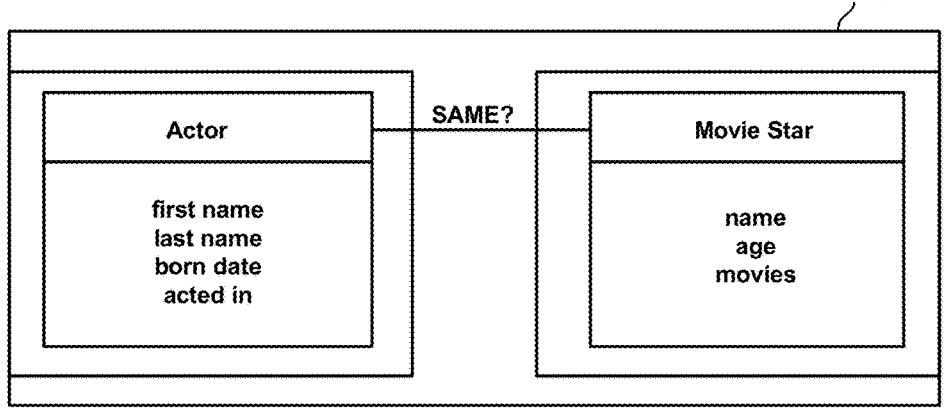
FIG. 11 illustrates examples of the generation of new nodes or edges and the learning of rules and ontology matches, in accordance with one or more embodiments

In some embodiments, model management subsystem 114 may cause a prediction model to construct new nodes or edges, learn rules, or learn ontology matches. Keeping with the movie theme, FIG. 11 shows examples 1100, 1102, and 1104 of generating new nodes or edges, learning rules, and learning ontology matches respectively, in accordance with one or more embodiments. As shown in example 1100, the prediction model may generate nodes such as a film and its corresponding title, the year the film was produced, the film's director, the film's producer, and one or more actors who starred in the film. In some embodiments, the prediction model may generate these nodes based on text provided to the prediction model or other information. (In some embodiments, as shown in FIG. 3, the text may have gone through metadata extraction, text extraction, graph extraction, or other extraction processes performed by model management subsystem 114 or other subsystems of server 102.) As shown in example 1102, the prediction model may learn rules. The prediction model may learn rules based on the nodes and edges of graphs, pathways through the nodes, or other information. In this example, the prediction model may learn that if a film is associated with violence, the film may be a crime genre film. Finally, as shown in example 1104, the prediction model may learn ontology matches. Ontology matches may include different words that refer to the same or similar concepts. As shown in this example, the prediction model may learn that that "Actor" and "Movie Star" correspond to the same concept. The ontology matching uses three different kinds of similarity metrics to find mappings between terms: syntactic, semantic and structural. Syntactic similarity evaluates the similarity of two terms based on the characters in the labels using techniques such as edit distance, fuzzy string matching or trigram cosine similarity. This would detect similarity between the terms "birthday" and "birthdate." Semantic similarity takes the meaning of the labels into account either by utilizing a manually curated lexical database (e.g., WordNet) or a separately trained word embedding model. Word embeddings map words to a vector representation based on the usage of words such that words used in similar ways in the training dataset will be have similar representations. This would detect the similarity of labels that are syntactically distinct like "Actor" and "Movie Star." Finally, structural similarity inspects how terms are defined within their schemas. For example, one schema might define the relationship "starredIn" between "Actor" and "Film" concepts, whereas the other schema defines the relationship "workedOn" between "MovieStar" and "Movie." Once the mappings between concepts are established ("Actor"–"MovieStar" and "Film"–"Move" mappings). Then the similarity of "starredIn" and "workedOn" will be detected based on the relationships having the same source and target types.

In some embodiments, request subsystem 116 may utilize one or more prediction models to determine one or more query plans. In some embodiments, request subsystem 116 may obtain path information (e.g., paths returned by path queries as described herein) for one or more graphs or graph databases, query plan information (e.g., indicating prior query plans, actual costs for executing the prior query plans, etc.), or other information from one or more historical databases or other sources. Request subsystem 116 may provide the path information, the query plan information, or other information to a prediction model to train the prediction model to predict information for one or more query plans to be used to respond to one or more requests (e.g., requests from users, predicted requests or other automatically-generated requests, etc.). In some embodiments, upon a prediction model being trained (or updated based on such training), request subsystem 116 may use the prediction model to generate one or more query plans (e.g., in real-time in response to requests from users, in response to prediction of requests, etc.).

Query Prediction, Storage, and Response

In some embodiments, request subsystem 116 may be configured to make a prediction that a data request will occur in the future. As an example, the request may include a query submission (or a client-initiated query), an update request related to the client-initiated query, or other request. In some embodiments, request subsystem 116 may predict a request for query results and obtain a subset of results responsive to the request prediction. Data management subsystem 112 may cause the subset of results to be stored in a temporary data storage (e.g., at a server cache, a web cache, memory cache, or other temporary data storage). In some embodiments, data management subsystem 112 may convert the subset of results into one or more subgraphs (e.g., if the results are not in a suitable graph form) and store the sub-graphs in the temporary data storage. When the predicted request (or a future request matching the predicted request) does occur, request subsystem 116 may obtain one or more of the subgraphs from the temporary data storage and use the obtained subgraphs to respond to the occurred predicted request. In this way, for example, the temporary storage of results in their converted form (prior to particular requests occurring) may significantly decrease latency or other delays for sufficiently responding to requests.

In some embodiments, request subsystem 116 may predict that a request will occur in the future based on prior queries (e.g., prior queries compatible with a graph data model or other prior queries). As an example, the request prediction may be based on request history information, such as information indicating one or more prior queries, information indicating respective frequencies of requests (e.g., a frequency of each of the prior queries, update requests related to the prior queries, etc.), information regarding users or client devices that initiated prior requests, or other information. In one scenario, at least some of the requested query results may be obtained based on the request prediction prior to the request being obtained from a client device in the future. The obtained query results may be stored (e.g., in a temporary data storage, such as a server cache, a web cache, memory cache, or other temporary data storage) in anticipation of the request occurring in the future so that the stored query results can be utilized to respond to the future request upon its occurrence.

In some embodiments, in response to a prediction of a data request, request subsystem 116 may generate one or more graph queries based on one or more parameters of the predicted data request. As an example, the parameters may include one or more search parameters such as keywords, a content item or identifier/location thereof (e.g., a content ID, a hyperlink or other pointer to the content item, etc.), logical operators (e.g., logical AND operators, logical OR operators, logical NOT operators, or other logical operators), or other parameters. In one use case, where the content item is an image, the image may be used for a search for similar images, content items having the same image or similar images, content items having similar concepts as concepts in the image, or other results. In another use case, where the content item is a video, the video may be used for a search for similar videos, content items having the same video or similar videos, content items having similar concepts as concepts in the video, or other results.

In some embodiments, based on a graph data model, request subsystem 116 may convert at least one of the graph queries into one or more non-graph queries (e.g., compatible with one or more SQL or other non-graph databases). As an example, the non-graph queries may be performed to obtain a data subset from one or more non-graph databases. In some embodiments, at least one of the graph queries may be performed to obtain a data subset from one or more graph databases. As an example, some of the graph queries may be converted to non-graph queries to obtain results (related to the predicted data request) stored at the non-graph databases. If, however, other ones of the graph queries are related to results stored at the graph databases, no conversion of the graph queries to non-graph queries may be needed. In one scenario, for example, request subsystem 116 may determine where results related to the graph queries are stored (e.g., which non-graph or graph databases the results are stored) and, based on such determination, select the non-graph databases or the graph databases from which such results are to be obtained. Based on the selection of at least a non-graph database (to obtain at least some results related to a given graph query), request subsystem 116 may convert the graph query to a non-graph query compatible with the non-graph database.

In some embodiments, data management subsystem 112 may be configured to generate a graph, one or more subgraphs (e.g., which collectively may form the graph or a portion thereof), or one or more graph data representations (e.g., nodes, edges, etc., which collectively may form the graph, the subgraphs, or a portion of the graph/subgraphs). As indicated herein, in some embodiments, data management subsystem 112 may utilize one or more graph data models to convert data representations (e.g., stored in SQL tables or other data sources) into graph representations (e.g., compatible with a particular graph database). Responsive to a prediction that a data request will occur in the future, and request subsystem 116 may obtain one or more data subsets that the future data request is predicted to seek from one or more data sources. Upon obtaining such data subsets, data management subsystem 112 may use a graph data model to convert the data subsets (e.g., in a non-graph form or other non-compatible representation) into one or more graph data representations or one or more subgraphs including the graph data representations (e.g., compatible with a particular graph database), in accordance with one or more techniques described herein.

In some embodiments, in response to a prediction of a data request, one or more data subsets may be obtained from one or more non-graph data sources (e.g., SQL databases or other non-graph data sources), and one or more other data subsets may be obtained from one or more graph data sources (e.g., graph databases or other graph data sources). As an example, the data subsets (from the non-graph data sources) may be obtained from the non-graph data sources as non-graph data representations (e.g., SQL rows or columns or other non-graph data representation), and the other data subsets (from the graph data sources) may be obtained from the graph data sources as nodes, edges, or other graph data representations (e.g., compatible with a particular graph database, not compatible with the graph database, etc.). Data management subsystem 112 may generate one or more subgraphs representative of the data subsets (from the non-graph data sources) and one or more other subgraphs representative the other data subsets (from the graph data sources). As an example, with respect to the non-graph source-obtained data subsets, data management subsystem 112 may use a graph data model to convert the non-graph data representations to graph data representations that are compatible with the graph database and compile the graph data representations into the representative subgraphs. As another example, with respect to the graph source-obtained data subsets, data management subsystem 112 may use a graph data model to compile the graph data representations (of such data subsets) into the other representative subgraphs. If the graph data representations are in a form not compatible with the graph database, data management subsystem 112 may use the graph data model to convert the non-compatible data representations to compatible graph data representations and compile the compatible graph data representations into the other representative subgraphs.

In some embodiments, data management subsystem 112 may store the subgraphs (derived from the non-graph data subsets) and the other subgraphs (derived from the graph data subsets) in a temporary data storage. In response to obtaining a subsequent data request matching the predicted data request, request subsystem 112 may obtain the subgraphs, the other subgraphs, or other information from the temporary data storage and use such obtained information to respond to the subsequent data request. In some embodiments, request subsystem may extract the data subsets from nodes, edges, or other graph data representations of the obtained subgraphs and return the extracted data subsets to respond to the subsequent data request.

In some embodiments, in response to obtaining a subsequent data request matching a predicted data request, request subsystem 116 may generate a query plan to respond to the subsequent data request. As an example, a candidate query plan may be selected from a collection of query plans (or template query plans) and modified to create the query plan to be specific for the subsequent data request. In some embodiments, where subgraphs or other information related to the predicted data request are stored in a temporary data storage, the query plan may be generated to include (i) obtaining the subgraphs or other information from the temporary data storage, (ii) obtaining other information from other data sources (e.g., graph databases, non-graph databases, etc.). As an example, based on the query plan, request subsystem 116 may obtain one or more subgraphs related to the predicted data request from the temporary data storage and one or more other data subsets (e.g., related to the predicted data request, related to the subsequent data request, etc.) from one or more other data sources. Request subsystem 116 may use the subgraphs (or data sets that the subgraphs represent) and the other data subsets to respond to the subsequent data request.

In some embodiments, queries (e.g., graph queries, non-graph queries) that are performed in response to prediction of a data request may be a portion of a set of queries that would have been performed to respond to the predicted data request had the predicted data request been obtained from a client device. In some embodiments, no performance of one or more other queries of the set of queries may occur from the prediction of the data request. As an example, no performance of queries for other may occur from the request prediction.

In some embodiments, the subset of results to the queries may be a portion of a set of results that would have been obtained to respond to the request had the request been obtained from a client device. For example, if the set of results are all the results that would have been provided on a first web page (e.g., a list of the most relevant results or other presentation) returned to a client device (as a response to the request), the subset of results may be a portion of those results provided on the first web page. In another use case, the set of results may be all the results that would have been obtained to respond to the request had the request been obtained from the client device. As an example, even if the other subsets (of the foregoing set of results) are obtained (e.g., via one or more queries responsive to the request prediction), a determination may be made not to store the other subsets (of the set of subgraphs) in the temporary data storage (e.g., based on frequency information, cost information, etc., as described herein).

In some embodiments, the obtainment or storage of subgraphs or other data (or the determination not to obtain or store other subgraphs or other data) may be based on frequency information, cost information, or other information. In some embodiments, request subsystem 116 may perform a selection of a subset of queries to be performed (over other queries) based on the frequency information, the cost information, or other information. The frequency information may include information indicating a frequency of requests matching the request or other information. The cost information may include information indicating costs for storing data in the temporary data storage, information indicating costs for performing respective queries, or other information. Such costs may, for instance, include a monetary cost, a computer resource cost (e.g., bandwidth or other network resource usage amount or other computer resource cost), or other costs.

A cost/benefit analysis may, for instance, be performed to determine which or the amount of results to be obtained or stored responsive to the request prediction. In one use case, request subsystem 116 may determine whether to perform queries (or which queries to perform) based on their respective costs (e.g., a cost to query a data source for data), the respective benefits of results obtained from those queries (e.g., a frequency of requests matching the predicted request, which of the results have priority over other results based on a requester's preferences, etc.), the respective costs for storing those results at the temporary data storage, or other criteria. In a further use case, scores may be assigned to respective queries (before they are executed) based on their respective costs, the respective benefits of results obtained from those queries, the respective costs for storing those results at the temporary data storage, or other criteria. As an example, a lower cost to query a data source for data may influence a higher assigned score for a corresponding query (compare to scores for other queries). A greater frequency of requests matching the predicted request may influence higher assigned scores for the queries related to the predicted request. A greater likelihood that results derived from one query will be presented to a requester (e.g., on a user interface over other results derived from other queries based on the requester's preferences) may influence a higher score for the query (compare to scores for the other queries). Based on their respective assigned scores, request subsystem 116 may determine whether or which of one or more of the queries are to be performed. As an example, request subsystem 116 may select a subset of the queries to be performed based on the subset of queries having greater scores than the other subsets of queries.

In another use case, even if obtained, temporary request subsystem 116 may determine whether to store results (or the amount of results to be stored) based on the respective costs for storing those results at the temporary data storage, the respective benefits of those results, or other criteria. In a further use case, scores may be assigned to respective results (e.g., subsets of results) based on the respective costs for storing those results at the temporary data storage, the respective benefits of those results, or other criteria. As an example, a lower cost to store certain subsets of results may influence higher assigned scores for the subset of results. A greater frequency of requests matching the predicted request may influence higher assigned scores for the results related to the predicted request. A greater likelihood that certain subsets of results will be presented to a requester (e.g., on a user interface over other results based on the requester's preferences) may influence a higher score for the subsets of results. Based on their respective assigned scores, request subsystem 116 may determine whether or which of the results are to be stored at the temporary data storage. Request subsystem 116 may, for instance, select a subset of the results (e.g., obtained from the performed queries) to be stored based on the subset of results having greater scores than the other subsets of results.

In some embodiments, although results may be obtained or stored responsive to a prediction of one or more requests (as described herein), no results may be obtained or stored responsive to a prediction of certain other requests (e.g., even if the probabilities of those other requests occurring each satisfies a certainty threshold). As an example, request subsystem 116 may determine not to perform any queries responsive to a prediction of a request based on a cost/benefit analysis performed with respect to the predicted request (e.g., based on frequency information, cost information, or other information). As another example, request subsystem 116 may determine not to store any results obtained from the request prediction based on a cost/benefit analysis performed with respect to the predicted request (e.g., based on frequency information, cost information, or other information).

In some embodiments, model management subsystem 114 may be configured to obtain request history information and provide the request history information to a prediction model to train the prediction model. The request history information may include (i) a collection of prior requests (e.g., user-submitted requests for data), (ii) a collection of prior queries generated from the prior requests (e.g., graph queries configured to be compatible with a graph data model), (iii) timing information indicating times at which the prior requests or queries are obtained, (iv) frequency information indicating frequencies of the prior requests or queries, (v) user information indicating the users (e.g., non-personally identifiable user identifiers or other identifiers) or the types of users (e.g., age, gender, location, or other categories of users) that submitted the prior requests and which of the prior requests were submitted by the users or types of users, or (vi) other information.

In some embodiments, the prediction model may be configured to obtain at least one type of the request history information and predict at least another type of the request history information based on the obtained information. As an example, for each prior request or query provided as input to the prediction model, model management subsystem 114 may provide the timing information (indicating times at which the prior request or query was obtained), the frequency information (indicating frequencies of the prior request or query), the user information (indicating the users or types of users that submitted the prior request), or other information related to the prior request or query as reference feedback for the prediction model's prediction of timing information, frequency information, user information or other information for the prior request or query to train the prediction model. The prediction model may use the reference feedback to assess its predicted information. As another example, for timing information, frequency information, or user information provided as input to the prediction model, model management subsystem 114 may provide the prior requests or queries associated with the input information as reference feedback for the prediction model's prediction of requests or queries to train the prediction model. The prediction model may use the reference feedback to assess its prediction of requests or queries. Based on its assessment of its prediction, the prediction model may update one or more portions of the prediction model (e.g., by adjusting weights of the prediction model's parameters or other portions of the prediction model in accordance with whether its prediction was accurate or how accurate its prediction was). In one use case, where the prediction model is a neural network, the neural network may update one or more layers of the neural network based on the neural network's assessment of its prediction of the additional templates.

In some embodiments, upon a prediction model being trained (or updated based on such training), model management subsystem 114 may use the prediction model to predict (i) one or more requests or queries, (ii) timing information for such requests or queries, (iii) frequency information for such requests or queries, (iv) user information for such requests or queries, or (v) other information for such requests or queries. As an example, such predictions may include one or more parameters of a predicted request, such as search parameters (e.g., keywords, a content item or identifier/location thereof, logical operators, etc.) or other parameters. As another example, such predictions may include one or more times of such predicted request (or a subsequent request matching the predicted request), frequencies of such predicted request, users or user types predicted to submit the request, or other predictions. Based on such predictions, request subsystem 116 may obtain one or more subsets of results and store the results in a temporary data storage (e.g., at a server cache, a web cache, memory cache, or other temporary data storage), as described herein (e.g., in a converted subgraph form compatible with a graph database or other form). When a predicted request (or a future request matching the predicted request) does occur, request subsystem 116 may obtain one or more of the results from the temporary data storage and use the obtained results to respond to the occurred predicted request.

Query Set Optimization

In some embodiments, optimization subsystem 118 may be configured to reduce query-related resource usage in a data retrieval process. In some embodiments, optimization subsystem 118 may reduce such query-related resource usage by optimizing a query set derived from a data request (e.g., an explicit request from a user or other request), such as a query set into which a graph query (or other query related to the data request) is transformed. In some embodiments, such query set optimizations may include removal of a query operator linking multiple queries from a query set, merging of multiple queries of a query set into a single query, removal of one or more queries from a query set, or other optimizations. Such optimizations may be performed based on a prediction of a satisfiability issue (e.g., related to combining results derived from certain queries), incompatibility issues, or other issues to avoid or mitigate such issues or negative impacts of such issues.

In some embodiments, request subsystem 116 may obtain and process multiple data requests (e.g., from one or more user devices) and determine whether the multiple data requests seek common target data (e.g., in which at least a portion of the data sought by the data requests is the same among the data requests). Based on a determination that the data requests seek common target data, request subsystem 116 may generate one or more queries (e.g., as part of a query set), where each of the queries is configured for obtaining at least a portion of the data commonly sought by the data requests such that this one query may be used to obtain the common data portion to respond to all the data requests. In some embodiments, request subsystem 116 may generate the queries such that at least one of the queries is configured for obtaining a first set of commonly-sought data from a first source and at least another one of the queries is configured for obtaining a second set of commonly-sought data from a second source. As an example, a given query for obtaining the first set of commonly-sought data from the first source may be configured to be compatible with the first source, compatible with the first source and not compatible with the second source, etc. As another example, a given query for obtaining the second set of commonly-sought data from the second source may be configured to be compatible with the second source, compatible with the second source and not compatible with the first source, etc. In response to obtaining the sets of commonly-sought data from the different sources (e.g., the first source, the second source, etc.), request subsystem 116 may combine the sets of commonly-sought data and return the combined sets to respond to each of the data requests.

In some embodiments, request subsystem 116 may determine that multiple data requests (e.g., obtained from one or more user devices) each seek two or more values associated with two or more attributes common to all the data requests. As an example, the data requests may be determined to collectively seek (i) the names of individuals in group A, the names of individuals in group B, etc. and (ii) the addresses of individuals in group A, the addresses of individuals in group B, etc. In one use case, a first data request may seek the name and address of a first individual in one of the groups, a second data request may seek the name and address of a second individual in one of the groups, and so on. In some embodiments, based on a determination (i) that values associated with a first common attribute (e.g., name) is obtainable from a first data source and (ii) that the values associated with a second common attribute (e.g., address) is obtainable from a second data source, request subsystem 116 may generate one or more queries (e.g., as part of a query set), where at least one of the queries is configured to obtain the values associated with the first common attribute from the first data source, and where at least another one of the queries is configured to obtain the values associated with the second common attribute from the second data source. In some embodiments, for each of the data requests, request subsystem 116 may join a requested value obtained from the first data source and a requested value obtained from the second data source and return the joined requested values to respond to the data request. In one scenario, for example, although there may be a number of data requests (e.g., tens of requests, hundreds of requests, thousands of requests, etc.) that each seek a name and address of a different individual, one query may be generated to obtain the names for all those data requests from the first data source, and another query may be generated to obtain the addresses for all those data requests from the second data source. Upon obtaining at least some of the names and addresses via performance of the two queries, the name and address for each individual may be joined and returned to respond to the corresponding data request (i.e., that sought the name and address for that particular individual).

In some embodiments, after obtaining a first request seeking one or more values associated with one or more attributes, request subsystem 116 may wait a predetermined amount of time before generating or performing one or more queries configured to obtain data to respond to the first request. As such, the wait period allows for other requests (seeking values associated with at least one attribute common with the attributes sought in the first request) to be obtained, thereby reducing the overall number of queries that need to be performed to respond to the first request and the other requests. In some embodiments, request subsystem 116 may determine whether the predetermined amount of time has passed (e.g., since obtaining a given request). If the predetermined amount of time has not passed, request subsystem 116 may delay generation or performance of one or more queries configured to obtain data for the given request. On the other hand, if the predetermined amount of time has passed, request subsystem 116 may determine which other requests have been obtained since obtaining the given request. For such the given request and other requests seeking values associated with at least one attribute as the values sought in the given request, request subsystem 116 may generate and cause performance of one or more queries that are each configured to obtain the values associated with a common attribute sought by the foregoing requests.

In some embodiments, request subsystem 116 may set a predetermined amount of time (for a wait period described herein) based on request history information, such as (i) a collection of prior requests, (ii) a collection of prior queries generated from the prior requests, (iii) timing information indicating times at which the prior requests or queries are obtained, (iv) frequency information indicating frequencies of the prior requests or queries, (v) user information indicating the users or the types of users that submitted the prior requests and which of the prior requests were submitted by the users or types of users, or (vi) other information. In some embodiments, a predetermined amount of time may be set for each category of request, where requests are categorized based on the content sought by the requests, the users or types of users (e.g., age, gender, location, or other categories of users), or other criteria. In some embodiments, such a predetermined amount of time may be determined for a given request in response to obtaining the request (e.g., in real-time). As an example, request subsystem 116 may determine a category of the request in response to obtaining the request and then determine the predetermined amount of time to be used for the wait period (e.g., to allow for more similar requests to be obtained).

As indicated herein, in some embodiments, request subsystem 116 may predict that one or more requests will occur in the future, such as a prediction of requests that each seek values associated with common attributes (e.g., common to all those requests). As discussed herein, such predictions may be based on request history information. In some embodiments, request subsystem 116 may set a predetermined amount of time for each category of requests based on the predictions related to future requests (e.g., predictions regarding when or how frequent requests in each category will occur). As also discussed herein, a prediction model may be trained based on the request history information to output indications of such predictions. In some embodiments, the prediction model may be configured to assess its own prediction, and, based on such assessment, the prediction model may update one or more portions of the prediction model (e.g., by adjusting weights of the prediction model's parameters or other portions of the prediction model in accordance with whether its prediction was accurate or how accurate its prediction was).

In some embodiments, request subsystem 116 may obtain a data request from a user device or other source and generate one or more queries based on the data request. In some embodiments, request subsystem 116 may generate a graph query based on the data request. In response to obtaining the graph query, optimization subsystem 118 may transform the graph query to a query set having multiple queries and query operators linking the queries (e.g., unions, joins, or other query operators). In some embodiments, the graph query may be compatible with a graph database, and the graph query may be used to generate multiple queries for the query set that are compatible with one or more target data sources. As an example, a query compatible with a data source can be executed to retrieve data from the data sources in accordance with a database management system of the data source. As generated, in some embodiments, the multiple queries may be compatible with the target data sources, but not compatible with the graph database (with which the graph query is compatible). In some embodiments, based on the data request, request subsystem 116 may generate a first recursive query (e.g., a graph recursive query compatible with a graph database). Request subsystem 116 may transform the first recursive query into one or more second recursive queries (e.g., for the query set). As an example, each of the second recursive queries may be configured to be compatible with a target data source such that, upon execution of one of the second recursive queries by a target computer system (e.g., hosting the target data source), the executed recursive query causes the target computer system to generate multiple queries from the second recursive query and to execute the multiple queries to obtain data relevant to the data request from the target data source.

In some embodiments, with respect to the foregoing query set, optimization subsystem 118 may predict one or more issues related to one or more portions of the query set and perform one or more optimizations on the query set based on the predicted issues to update the query set. As such, when the updated query set is executed to satisfy the graph query (and, thus, the data request), the predicted issues or the negative impacts of the predicted issues may be avoided or mitigated.

As an example, a data request may ask for the salary of an employee and the projects on which the employee has been assigned to work. The data request may be written as a graph query with the following two patterns (e.g., which reflects how the results of the query are to be stored as data representations in a graph, where "employee" and "salary" nodes are connected by a "hasSalary" edge, and "employee" and "project" nodes are connected by a "worksOn" edge):

?employee:hasSalary ?salary
?employee:worksOn ?project

In one use case, with respect to the foregoing example, mappings (or templates defined by such mappings) may indicate the source table(s) in a RDBMS that include the salary or project information, and optimization subsystem 118 use the mappings (along with a database-specific query translator) to transform the graph query into a query set in the language of the database. In some cases, there may be more than one source for each relationship, resulting in a query set having a number of query operators. For example, an employee may work on multiple projects, and these projects may be stored in multiple tables. In some cases, transformation of the graph query into a query set (to obtain results from the RDBMS) may generate a UNION for a source corresponding to a pattern and create a Cartesian product of UNIONs for each pattern as SQL joins. If there are N patterns in the graph query and M sources for each term, the query transformation may produce N×M UNIONs. Optimization subsystem 118 may reduce the number of UNIONs, simplify joins inside a given UNION, or otherwise optimize the query set.

In some embodiments, optimization subsystem 118 may predict one or more satisfiability issues related to a query set (e.g., an initial query set transformed from a graph query or other query). In some embodiments, based on a prediction of a satisfiability issue (related to combining results derived from two of the queries), optimization subsystem 118 may remove a query operator that links the two queries from the query set or perform other optimizations on the query set to update the query set. As such, when system 100 executes the updated query set to satisfy the graph query (and, thus, the data request), system 100 may avoid or mitigate the satisfiability issue or the negative impacts of the satisfiability issue, such as (i) the waste of resources used to execute one or more portions of the query set and attempting to combine incompatible results derived from such query set execution, (ii) the delay resulting from such execution and attempts, or (iii) other negative impacts.

In some embodiments, where multiple queries in a query set are linked by one or more query operators (e.g., unions, joins, or other query operators), optimization subsystem 118 may determine one or more sources for obtaining results for the linked queries. If there are at least two sources from which results are to be obtained for two of the queries (and such results will initially be non-compatible with a graph database), optimization subsystem 118 may assess templates configured to convert data representations from such sources to graph data representations compatible with the graph database. If optimization subsystem 118 determines an incompatibility related to at least two such templates, optimization subsystem 118 may predict a satisfiability issue (related to combining results derived from the two queries) and remove the query operator linking the two queries from the query set or perform other optimizations on the query set to update the query set. In one use case, mappings may define templates for converting rows from the RDBMS to nodes in a graph by creating globally unique identifiers (which may be referred to as IRIs). As an example, an employee with ID 123 may be mapped to an identifier such as "http://example.org/employee/123." If the mappings for the two sources use incompatible templates, optimization subsystem 118 may predict that the join results will be empty and can be eliminated. As an example, if one template is in the form of http://example.org/employee/{ID}, but another template is in the form of http://example.org/department/{ID}, then it can be conclude that the two templates are incompatible regardless of the ID value. In other words, templates have fixed and variable parts, e.g., "http://example.org/employee/" and "{ID}," respectively. The value of the variables before executing a query is not known, but, if the fixed parts of the templates are inconsistent, the inconsistency can be used to rule out the possibility of any join between the two templates.

In some embodiments, optimization subsystem 118 may determine data types corresponding to results for queries linked by one or more query operators in a query set, and perform optimizations on the query set based on one or more incompatibilities related to the data types. In some embodiments, optimization subsystem 118 may determine that a first data type used to store a first set of results (from one of the linked queries of the query set) in a graph database is incompatible with a second data type used to store a second set of results (from another one of the linked queries) in the graph database. Based on the data type incompatibility determination, optimization subsystem 118 may predict a satisfiability issue (related to combining results derived from the two queries) and remove the query operator linking the two queries from the query set or perform other optimizations on the query set to update the query set. In one scenario, for example, columns in the tables may be mapped to primitive values in the graph (e.g., integer, string, date, etc.) instead of IRIs. If a query attempts to join two incompatible types (e.g., integer and date) from two tables, such an attempt will fail (in this scenario). As such, if it is determined that such data types will be used to respectively store the two sets of data, optimization subsystem 118 may predict the satisfiability issue (e.g., the failure to join the two incompatible types) and perform the appropriate optimizations (e.g., removal of the corresponding query operator, supplementing a different operator in in lieu of the query operator, etc.).

In some embodiments, based on a prediction of one or more satisfiability issues related to a query set, optimization subsystem 118 may predict one or more additional satisfiability issues related to the predicted satisfiability issues and to the query set. Optimization subsystem 118 may remove one or more query operators related to the additional satisfiability issues or perform other optimizations on the query set. In some embodiments, first, second, and one or more other queries may be linked by query operators in a query set. Based on a prediction of a first satisfiability issue related to the first and second queries (e.g., related to combining results derived from the first and second queries), optimization subsystem 118 may remove a first query operator linking the first and second queries in the query set or otherwise modify the query set portion including the first and second queries (e.g., to exclude the first query operator or perform other changes). Based on the prediction of the first satisfiability issue, optimization subsystem 118 may predict one or more other satisfiability issues (e.g., related to combining results derived from the first query and at least one of the other queries, results derived from the second query and at least one of the other queries, etc.). Based on the prediction of the other satisfiability issues, optimization subsystem 118 may remove a second query operator linking two or more of the first, second, or other queries or otherwise modify the query set portion including the two or more queries (e.g., to exclude the second query operator or perform other changes). In one use case, optimization subsystem 118 may modify one or more portions of the query set (e.g., to exclude one or more query operator or perform other changes) to optimize for unsatisfiability propagation. As an example, with respect to the graph query that has the two patterns "?employee:hasSalary ?salary" and "?employee:worksOn ?project," optimization subsystem 118 may predict other issues likely to propagate from the patterns if it determines that there are satisfiability issues related to the two foregoing patterns (e.g., the results derived from the queries generated from such patterns cannot be joined). In a further example, responsive to two patterns being found to be unsatisfiable (e.g., they cannot be joined), optimization subsystem 118 may determine that the unsatisfiability propagates through the query set even if there may be other satisfiable patterns. If, for instance, another pattern is added to the graph query (e.g., to attempt to retrieve an employee name), optimization subsystem 118 may determine that no results will be returned because the first two patterns did not join.

In some embodiments, optimization subsystem 118 may perform one or more self-join eliminations or other optimizations on the query set (e.g., prior to transmitting the queries to one or more RDBMSs or other database management systems at which the queries are to be executed). In some embodiments, one of the UNION components cannot be eliminated but it may be simplified to improve performance. If two patterns are mapped to the same source table and there is a unique key for the table, then optimization component 118 may generate a single query (e.g., SELECT employee, salary, project FROM employees) instead of a join (e.g., SELECT e1.employee, e1.salary, e2.employee, e2.salary FROM employees AS e1, employees as e2 WHERE e1.employee=e2.employee). In this case, although a SQL optimizer at the query executing database management system may perform this kind of transformation, the complexity of generated SQL queries go beyond what SQL optimizers can handle as more patterns are added to the query. Queries with too many join conditions and expressions in the SQL WHERE clause increases the SQL optimizer's search space exponentially resulting in the optimizer to use heuristics and generate sub-optimal query plans.

In some embodiments, optimization subsystem 118 may provide graph queries, corresponding query sets (derived from the graph queries), or other information to a prediction model to cause the prediction model to predict (i) one or more issues related to each of the corresponding query sets, (ii) optimizations for each of the corresponding query sets, or (ii) other information. As an example, such issues may include one or more satisfiability issues (e.g., related to combining results derived from certain queries), incompatibility issues, or other issues. Such query set optimizations may include removal of a query operator linking multiple queries from a query set, merging of multiple queries of a query set into a single query, removal of one or more queries from a query set, or other optimizations. In some embodiments, with respect to each of the corresponding query sets, optimization subsystem 118 may provide one or more reference issues or optimizations for the corresponding query set to the prediction model as reference feedback for the prediction model's prediction of the issues or optimizations to train the prediction model. As an example, the reference issues or optimizations may be provided as reference feedback to cause the prediction model to assess the predicted issues or optimizations against the reference issues or optimizations. The prediction model may use the reference issues or optimizations to assess its prediction of the issues or optimizations. Based on its assessment of its prediction, the prediction model may update one or more portions of the prediction model (as described herein).

In some embodiments, optimization subsystem 118 may provide graph queries or other information to a prediction model to cause the prediction model to predict a query set for each of the graph queries. In some embodiments, with respect to each of the graph queries, optimization subsystem 118 may provide a reference query set for the graph query to the prediction model as reference feedback for the prediction model's prediction of the query set to train the prediction model. As an example, the reference query set may be provided as reference feedback to cause the prediction model to assess the predicted query set against the reference query set. The prediction model may use the reference query set to assess its prediction of the query set. Based on its assessment of its prediction, the prediction model may update one or more portions of the prediction model (as described herein).

In some embodiments, upon a prediction model being trained (or updated based on such training), optimization subsystem 118 may use the prediction model to determine one or more (i) issues related to an initial query set derived from a graph query (or other query) or (ii) optimizations for the initial query set. As an example, optimization subsystem 118 may provide the graph query or the initial query set as input to the prediction model to obtain a prediction of (i) the issues related to the initial query set, (i) the optimizations for the initial query set, or (iii) the optimized query set. In one use case, responsive to such input, the prediction model may output the optimized query set, indications of such issues, or indications of such optimizations (e.g., instructions for such optimizations or other indications). In another use case, optimization subsystem 118 may use the indications of the issues or optimizations to transform the initial query set into the optimized query set.

Displaying Query Response Results

Presentation subsystem 120 may be configured to cause display of query results or other information. Presentation subsystem 120 may be configured to cause the display of the query results based on the graph data model templates, the predictions of requests for query results, the subsets of results obtained responsive to the request predictions, the subsets of results stored in sub-graphs in temporary data storage, or other information. The displayed query results may include one or more fields in one or more views of a graphical user interface or other interfaces. The graphical user interface may be displayed on one or more client devices 104, or other computing systems. In some embodiments, the display may include graphical, textual, or other representations. In some embodiments, the display may include a sub-map, a map, or other views of a graph data model. In some embodiments, the display may include provision of one or more textual and/or graphical fields in various views of the graphical user interface, or other displays.

In some embodiments, presentation subsystem 120 may be configured to communicate with the graphical user interface to facilitate entry or selection of information from a user. For example, as described herein, in some embodiments, a given node or edge from a prediction model may be added to a graph based on a user confirmation entered or selected via the graphical user interface with respect to adding the given node or edge. An indication of the user confirmation may be provided by presentation subsystem 120 to the prediction model as reference feedback regarding the prediction model's generation of the given node or edge. In some embodiments, a user declination with respect to adding the given node or edge may be obtained by presentation subsystem 120 via the graphical user interface. Responsive to a user declination, the given node or edge may not be added to the graph. An indication of the user declination may be provided to the prediction model by presentation subsystem 120 as reference feedback regarding the prediction model's generation of the given node or edge.

In some embodiments, presentation subsystem 120 may be configured to communicate with a graphical user interface to facilitate expansion and contraction, pop up, and/or other display of one or more menus, fields, and/or other objects within or adjacent to one or more of the other fields. In some embodiments, presentation subsystem 120 may cause such displays responsive to pointing, clicking, or hovering over a specific portion of the display with a pointer or other indicator by a user. In some embodiments, the expanded fields, the pop-up fields, additional menu items, and/or other objects display additional complimentary or information that corresponds to the query results to a user.

Examples Flowcharts

Figure 12:
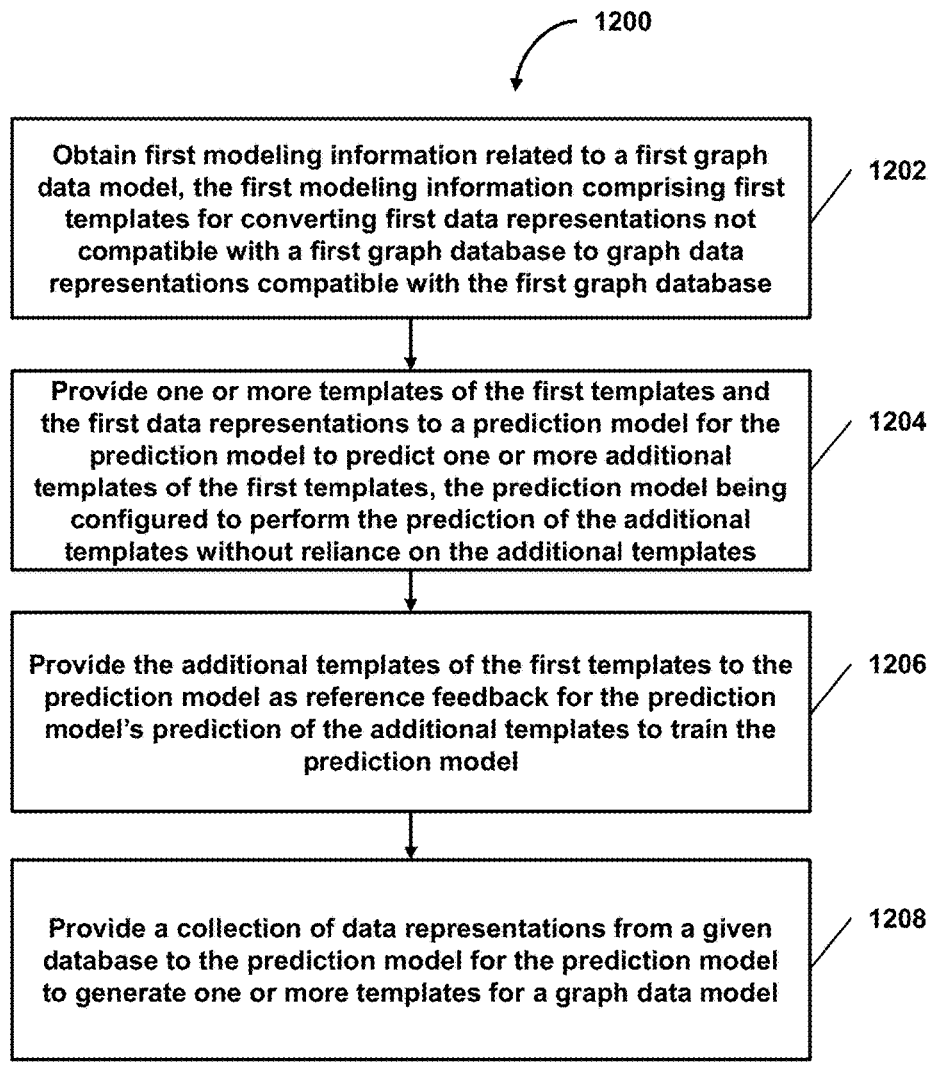
FIG. 12 illustrates a method for providing a prediction-model-based generation of a graph data model, in accordance with one or more embodiments.
Figure 13:
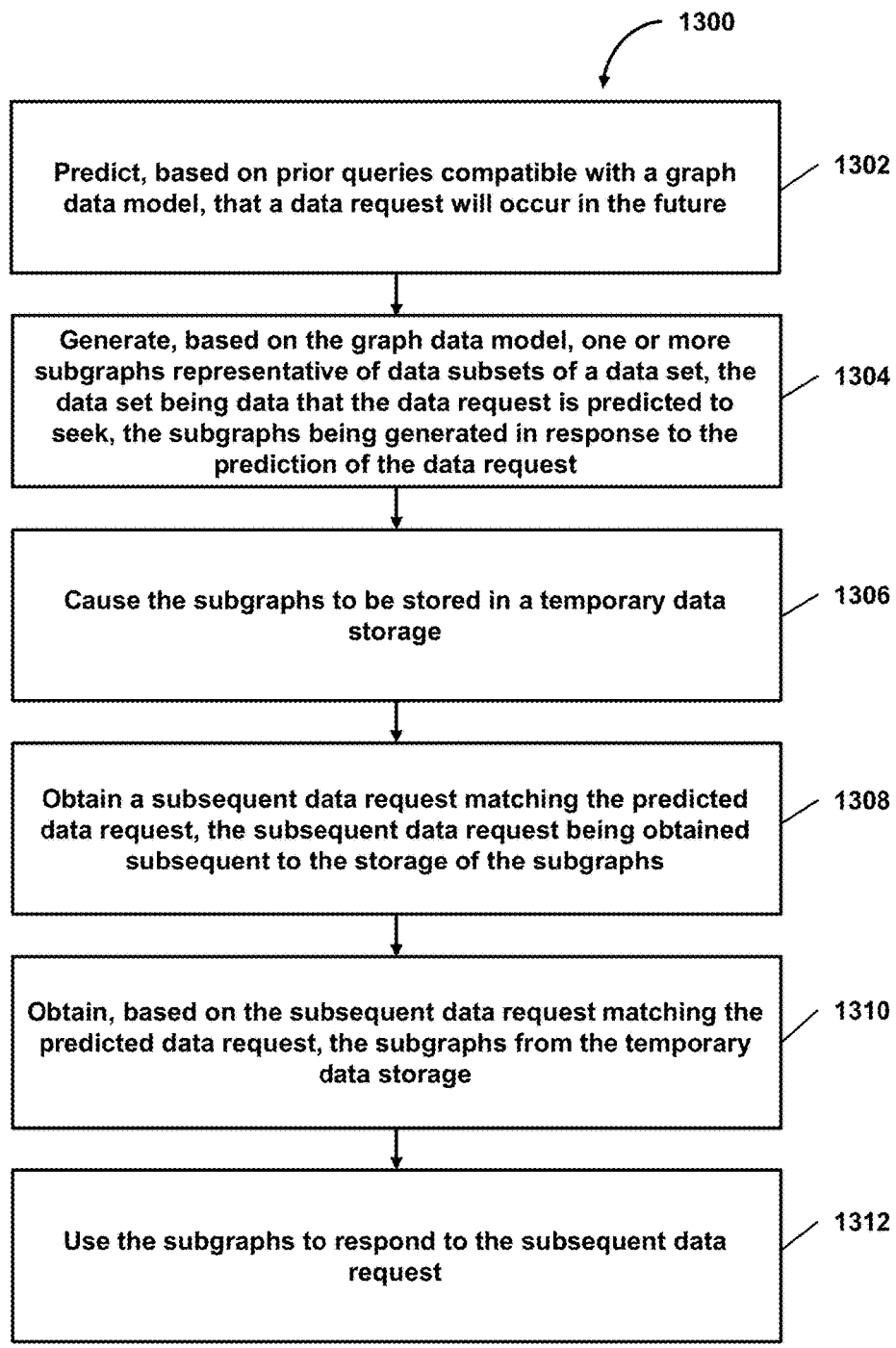
FIG. 13 illustrates a method for reducing data retrieval delays via prediction-based generation of data subgraphs, in accordance with one or more embodiments.
Figure 14:
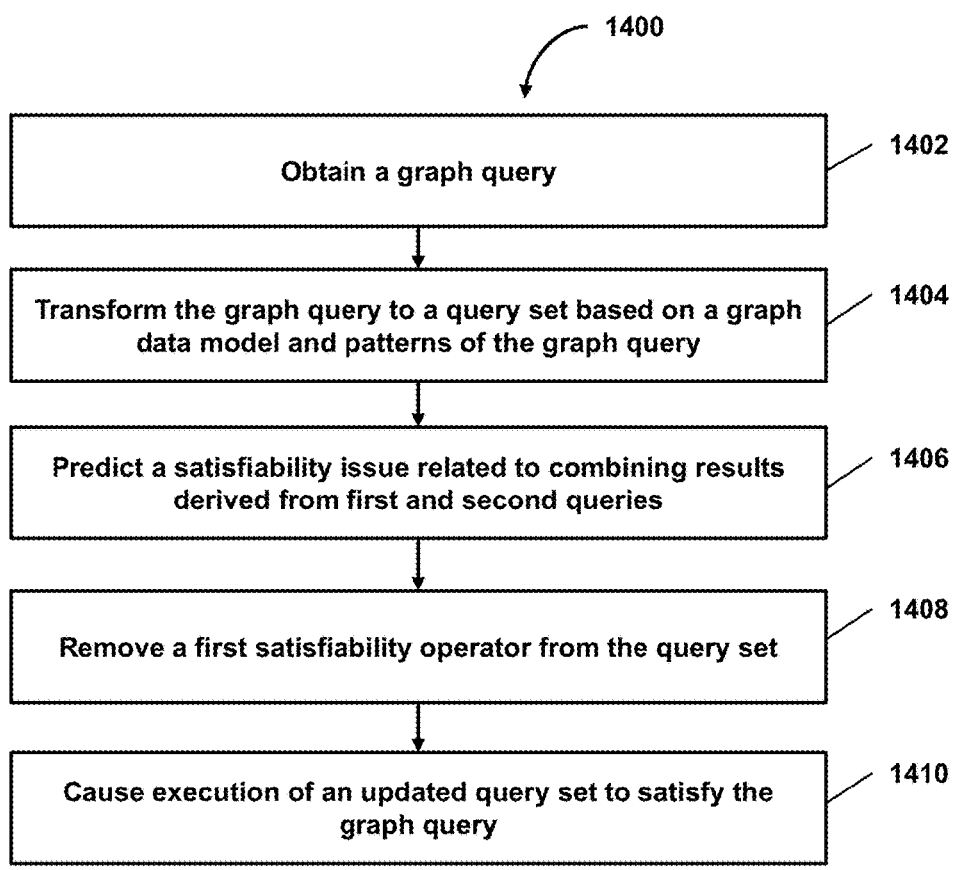
FIG. 14 illustrates a flowchart of a method for reducing query-related resource usage in a data retrieval process, in accordance with one or more embodiments.

FIGS. 12-14 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods.

FIG. 12 shows a flowchart of a method 1200 of generating a graph via a prediction model, in accordance with one or more embodiments. In some embodiments, the prediction model may include a neural network, a machine learning model, or other prediction model.

In an operation 1202, first modeling information may be obtained. The first modeling information may be related to a first graph data model. The first modeling information may include first templates for converting first data representations not compatible with a first graph database to graph data representations compatible with the first graph database. In some embodiments, operation 1202 may include obtaining graph information related to nodes and edges of a graph in the given graph database. The graph information may indicate data representation sets. Each data representation set of the data representation sets may include nodes and edges connecting the nodes. Operation 1202 may be performed by a graph generation subsystem that is the same as or similar to data management subsystem 112, in accordance with one or more embodiments.

In an operation 1204, one or more templates of the first templates and the first data representations may be provided to a prediction model. The prediction model may predict one or more additional templates of the first templates. The prediction model may be configured to perform the prediction of the additional templates without reliance on the additional templates. In some embodiments, operation 1204 may include, for each data representation set of the data representation sets, providing one or more nodes or edges of the data representation set to the prediction model. The prediction model may predict one or more additional nodes or edges of the data representation set. The prediction model may be configured to perform the prediction of the additional nodes or edges without reliance on the additional nodes or edges. Operation 1204 may be performed by a graph generation subsystem that is the same as or similar to data management subsystem 112, in accordance with one or more embodiments.

In an operation 1206, the additional templates of the first templates may be provided to the prediction model. These templates may be provided as reference feedback for the prediction model's prediction of the additional templates. This feedback may train the prediction model. In some embodiments, operation 1206 may include, for each data representation set of the data representation sets, providing the additional nodes or edges of the data representation set to the prediction model as reference feedback for the prediction model's prediction of the additional nodes or edges to train the prediction model. Operation 1206 may be performed by a model subsystem that is the same as or similar to model management subsystem 114, in accordance with one or more embodiments.

In an operation 1208, a collection of data representations from a given database may be provided to the prediction model. These data representations may allow the prediction model to generate one or more templates for a given graph data model for converting the given database's data representations into graph data representations for a given graph database. In some embodiments, the graph data representations of the given graph database include graph nodes or edges connecting the graph nodes. Operation 1208 may be performed by a graph generation subsystem that is the same as or similar to data management subsystem 112, in accordance with one or more embodiments.

In some embodiments, operation 1208 may include, performing, via the prediction model, traversal of a graph to process nodes or edges of the graph. This may cause the prediction model to generate new nodes or edges for the graph. The new nodes or edges from the prediction model may be added to the graph. A given node or edge from the prediction model may be added to the graph based on the traversal of the graph. In some embodiments, the given node or edge from the prediction model may be added to the graph based on a user confirmation with respect to adding the given node or edge. An indication of the user confirmation may be provided to the prediction model as reference feedback regarding the prediction model's generation of the given node or edge. In some embodiments, a user declination with respect to adding the given node or edge may be obtained. Responsive to a user declination, the given node or edge may not be added to the graph. An indication of the user declination may be provided to the prediction model as reference feedback regarding the prediction model's generation of the given node or edge.

In some embodiments, method 1200 may further include obtaining second modeling information related to a second graph data model. The second modeling information may include second templates for converting second data representations not compatible with a second graph database to graph data representations compatible with the second graph database. In some embodiments, the first data representations and the second data representations may be compatible with a same database. In some embodiments, the first data representations may be compatible with a first non-graph database. The second data representations may be compatible with a second non-graph database and not compatible with the first non-graph database. In some embodiments, the first data representations or the second data representations may be compatible with at least one graph database.

In some embodiments, method 1200 further includes providing one or more templates of the second templates and the second data representations to the prediction model. The prediction model may predict one or more additional templates of the second templates. The prediction model may be configured to predict the additional templates of the second templates without reliance on the additional templates of the second templates. In some embodiments, method 1200 further includes providing the additional templates of the second templates to the prediction model as reference feedback for the prediction model's prediction of the additional templates of the second templates to train the prediction model.

FIG. 13 shows a flowchart of a method 1300 of reducing data retrieval delays via prediction-based generation of data subgraphs, in accordance with one or more embodiments.

In an operation 1302, a prediction that a data request will occur in the future may be made. The prediction may be based on prior queries compatible with a graph data model. Operation 1302 may be performed by a request subsystem that is the same as or similar to request subsystem 116, in accordance with one or more embodiments.

In an operation 1304, one or more subgraphs may be generated. The generation of the subgraphs may be based on the graph data model. The subgraphs may be representative of data subsets of a data set. The data set may be data that the data request is predicted to seek. The subgraphs may be generated in response to the prediction of the data request. Operation 1304 may be performed by a request subsystem that is the same as or similar to request subsystem 116, in accordance with one or more embodiments.

In an operation 1306, the subgraphs may be stored in a temporary data storage. Operation 1306 may be performed by a request subsystem that is the same as or similar to request subsystem 116, in accordance with one or more embodiments.

In an operation 1308, a subsequent data request matching the predicted data request may be obtained. The subsequent data request may be obtained subsequent to the storage of the subgraphs. Operation 1308 may be performed by a request subsystem that is the same as or similar to request subsystem 116, in accordance with one or more embodiments.

In an operation 1310, the subgraphs may be obtained from the temporary data storage. The subgraphs may be obtained based on the subsequent data request matching the predicted data request. A query plan may be generated based on the subsequent data request matching the predicted data request. The query play may be generated to respond to the subsequent data request. The query plan may be generated to include obtaining data from the temporary data storage based on the subsequent data request matching the predicted data request. Operation 1310 may be performed by a request subsystem that is the same as or similar to request subsystem 116, in accordance with one or more embodiments.

In an operation 1312, the subgraphs may be used to respond to the subsequent data request. As an example, the data subsets may be extracted from nodes and edges of the one or more subgraphs, and the extracted data subsets may be returned to respond to the subsequent data request. Operation 1312 may be performed by a request subsystem that is the same as or similar to request subsystem 116, in accordance with one or more embodiments.

FIG. 14 shows a flowchart of a method 1400 for reducing query-related resource usage in a data retrieval process, in accordance with one or more embodiments. In an operation 1402, a graph query may be obtained. The graph query may be related to a data request or other requests. The graph query may include patterns or other information. Operation 1402 may be performed by an optimization subsystem that is the same as or similar to optimization subsystem 118, in accordance with one or more embodiments.

In an operation 1404, the graph query may be transformed into a graph query set. The transformation may be based on a graph data model, the patterns of the graph query, or other information. The query set may include queries and query operators linking the queries. The query operators may include a first query operator linking first and second queries of the queries. Operation 1404 may be performed by an optimization subsystem that is the same as or similar to optimization subsystem 118, in accordance with one or more embodiments.

In some embodiments, operation 1404 may include providing graph queries to a prediction model (e.g., a neural network, a machine learning model, etc.) to cause the prediction model to predict a given query set for each of the graph queries. At least one of the predicted given query sets may include predicted queries and predicted query operators linking the predicted queries. In such embodiments, operation 1404 may include providing, with respect to each of the graph queries, a reference query set for the graph query as reference feedback to the prediction model to cause the prediction model to assess the predicted given query set against the reference query set. The prediction model may be updated based on the prediction model's assessment of the predicted given query set. In such embodiments, operation 1404 may include transforming the graph query to the query set by providing the graph query to the prediction model to obtain the query set and providing the updated query set to the prediction model as reference feedback to the prediction model to cause the prediction model to assess the query set against the updated query set. The prediction model may be updated based on the prediction model's assessment of the query set.

In an operation 1406, a satisfiability issue related to combining results derived from the first and second queries may be predicted. The prediction may be made prior to execution of the first and second queries. In some embodiments, predicting the satisfiability issue may include determining first and second sources for obtaining results for the first and second queries, and determining an incompatibility related to first and second templates. The first template may be configured for converting data representations from the first source to graph data representations compatible with a graph database. The second template may be configured for converting data representations from the second source to graph data representations compatible with the graph database. Operation 1406 may be performed by an optimization subsystem that is the same as or similar to optimization subsystem 118, in accordance with one or more embodiments.

In an operation 1408, the first query operator may be removed from the query set. In some embodiments, the first query operator may include a union linking the first and second queries or a join linking the first and second queries. The removal may be based on the prediction of the satisfiability issue or other information. The first query operator may be removed from the query set to update the query set such that the updated query set does not include the first query operator. In some embodiments, operations 1406 and/or 1408 may include predicting, prior to execution of a subset of queries of the query set, based on the prediction of the satisfiability issue, another satisfiability issue related to combining results derived from the subset of queries. The subset of queries may not include the first query or the second query. In such embodiments, operation 1408 may include removing, based on the prediction of the other satisfiability issue, the second query operator from the query set to update the query set such that the updated query set does not include the second query operator. Operation 1408 may be performed by an optimization subsystem that is the same as or similar to optimization subsystem 118, in accordance with one or more embodiments.

In an operation 1410, execution of the updated query set to satisfy the graph query may be caused. Operation 1410 may be performed by a request subsystem that is the same as or similar to optimization subsystem 118, in accordance with one or more embodiments.

In some embodiments, one or more of the operations of method 1400 described above may include providing graph queries or corresponding query sets to a prediction model to cause the prediction model to predict one or more given optimizations for each of the corresponding query sets. At least one of the predicted given optimizations may include removal of a given query operator linking multiple queries from a given query set, merging of multiple queries into a single query, or removal of one or more queries from a given query set. Method 1400 may include providing, with respect to each of the corresponding query sets, one or more reference optimizations for the corresponding query set as reference feedback to the prediction model to cause the prediction model to assess the predicted given optimizations against the one or more reference optimizations. The prediction model may be updated based on the prediction model's assessment of the predicted given optimizations. Method 1400 may include providing the graph query or an initial query set derived from the graph query to the prediction model to obtain one or more optimizations for the initial query set. Method 1400 may include transforming the graph query to the query set by performing the optimizations on the initial query set. Method 1400 may include providing an indication of the removal of the first query operator to the prediction model as reference feedback to the prediction model to cause the prediction model to assess the optimizations against the removal of the first query operator. The prediction model may be updated based on the prediction model's assessment of the optimizations.

In some embodiments, one or more of the operations of method 1400 described above may include providing given query sets to a prediction model to cause the prediction model to predict one or more satisfiability issues related to each of the given query sets. Method 1400 may include providing, with respect to each of the given query sets, one or more reference satisfiability issues for the given query set as reference feedback to the prediction model to cause the prediction model to assess the predicted satisfiability issues against the reference satisfiability issues. The prediction model may be updated based on the prediction model's assessment of the predicted satisfiability issues. Method 1400 may include providing the query set to the prediction model to obtain an indication of the prediction of the satisfiability issue from the prediction model. Method 1400 may include predicting, based in the indication from the prediction model, the satisfiability issue related to combining results derived from the first and second queries.

In some embodiments, the various computers and subsystems illustrated in FIG. 1 may include one or more computing devices that are programmed to perform the functions described herein. The computing devices may include one or more electronic storages (e.g., data source(s) 132 or other electric storages), one or more physical processors programmed with one or more computer program instructions, or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining first modeling information related to a first graph data model, the first modeling information comprising first templates for converting first data representations not compatible with a first graph database to graph data representations compatible with the first graph database; providing one or more templates of the first templates and the first data representations to a machine learning model for the machine learning model to predict one or more additional templates of the first templates, the machine learning model being configured to perform the prediction of the one or more additional templates without reliance on the one or more additional templates; providing the one or more additional templates of the first templates to the machine learning model as reference feedback for the machine learning model's prediction of the one or more additional templates to train the machine learning model; and providing a collection of data representations from a given database to the machine learning model for the machine learning model to generate one or more templates for a given graph data model for converting the given database's data representations into graph data representations for a given graph database.

2. The method of embodiment 1, wherein the graph data representations of the given graph database comprises graph nodes or edges connecting the graph nodes.

3. The method of any of embodiments 1-2, further comprising: obtaining second modeling information related to a second graph data model, the second modeling information comprising second templates for converting second data representations not compatible with a second graph database to graph data representations compatible with the second graph database; providing one or more templates of the second templates and the second data representations to the machine learning model for the machine learning model to predict one or more additional templates of the second templates, the machine learning model being configured to predict the one or more additional templates of the second templates without reliance on the one or more additional templates of the second templates; and providing the one or more additional templates of the second templates to the machine learning model as reference feedback for the machine learning model's prediction of the one or more additional templates of the second templates to train the machine learning model.

4. The method of embodiment 3, wherein the first data representations and the second data representations are compatible with a same database.

5. The method of embodiment 3, wherein the first data representations is compatible with a first non-graph database, and wherein the second data representations are compatible with a second non-graph database and not compatible with the first non-graph database.

6. The method of embodiment 3, wherein the first data representations or the second data representations are compatible with at least one graph database.

7. The method of any of embodiments 1-6, further comprising: obtaining graph information related to nodes and edges of a graph in the given graph database, the graph information indicating data representation sets, each data representation set of the data representation sets comprising nodes and edges connecting the nodes; for each data representation set of the data representation sets, providing one or more nodes or edges of the data representation set to the machine learning model for the machine learning model to predict one or more additional nodes or edges of the data representation set, the machine learning model being configured to perform the prediction of the one or more additional nodes or edges without reliance on the one or more additional nodes or edges; for each data representation set of the data representation sets, providing the one or more additional nodes or edges of the data representation set to the machine learning model as reference feedback for the machine learning model's prediction of the one or more additional nodes or edges to train the machine learning model.

8. The method of embodiment 7, further comprising: performing, via the machine learning model, traversal of the graph to process nodes or edges of the graph to cause the machine learning model to generate new nodes or edges for the graph; and adding the new nodes or edges from the machine learning model to the graph.

9. The method of embodiment 8, further comprising: obtaining a given node or edge from the machine learning model based on the traversal of the graph; adding the given node or edge from the machine learning model to the graph based on a user confirmation with respect to adding the given node or edge; and providing an indication of the user confirmation to the machine learning model as reference feedback regarding the machine learning model's generation of the given node or edge.

10. The method of embodiment 8, further comprising: obtaining a given node or edge from the machine learning model based on the traversal of the graph; obtaining a user declination with respect to adding the given node or edge, wherein the given node or edge is not added to the graph based on the user declination; and providing an indication of the user declination to the machine learning model as reference feedback regarding the machine learning model's generation of the given node or edge.

11. A method comprising: predicting that a data request will occur in the future; generating, based on a graph data model, one or more subgraphs representative of data subsets of a data set, the data set being data that the data request is predicted to seek, the one or more subgraphs being generated in response to the prediction of the data request; causing the one or more subgraphs to be stored in a temporary data storage; obtaining a subsequent data request matching the predicted data request, the subsequent data request being obtained subsequent to the storage of the one or more subgraphs; obtaining, based on the subsequent data request matching the predicted data request, the one or more subgraphs from the temporary data storage; and using the one or more subgraphs to respond to the subsequent data request.

12. The method of embodiment 11, wherein using the one or more subgraphs comprises: extracting the data subsets from nodes and edges of the one or more subgraphs; and returning the extracted data subsets to respond to the subsequent data request.

13. The method of any of embodiments 11-12, further comprising: obtain a first data subset of the data subsets from one or more non-graph databases in response to the prediction of the data request, wherein generating the one or more subgraphs comprises generating, based on the graph data model, a first subgraph representative of the first data subset subsequent to the obtainment of the first data subset, the one or more subgraphs comprising the first subgraph such that the first subgraph is used to respond to the subsequent data request.

14. The method of embodiment 13, further comprising: obtain a second data subset of the data subsets from one or more graph databases in response to the prediction of the data request, wherein the one or more subgraphs comprises a second subgraph representative of the second data subset such that the second subgraph is used to respond to the subsequent data request.

15. The method of embodiment 14, further comprising: generating graph queries based on one or more search parameters of the predicted data request; converting, based on the graph data model, at least one of the graph queries into one or more non-graph queries; performing the one or more non-graph queries to obtain the first data subset from the one or more non-graph databases; and performing at least another one of the graph queries to obtain the second data subset from the one or more graph databases.

16. The method of any of embodiments 11-15, further comprising: generating, based on the subsequent data request matching the predicted data request, a query plan to respond to the subsequent data request, the query plan being generated to include obtaining data from the temporary data storage based on the subsequent data request matching the predicted data request, wherein obtaining the one or more subgraphs comprises obtaining, based on the query plan, the one or more subgraphs from the temporary data storage.

17. The method of any of embodiments 11-16, further comprising: generating, based on the subsequent data request matching the predicted data request, a query plan to respond to the subsequent data request, the query plan being generated in response to the subsequent data request, wherein obtaining the one or more subgraphs comprises obtaining, based on the query plan, the one or more subgraphs from the temporary data storage and one or more other data subsets from one or more other data sources, and wherein using the one or more subgraphs comprises using (i) the data subsets represented by the one or more subgraphs and (ii) the one or more other data subsets to respond to the subsequent data request.

18. The method of any of embodiments 11-17, further comprising: performing queries in response to the prediction of the data request, wherein the performed queries are a portion of a set of queries that would have been performed to respond to the predicted data request had the predicted data request been obtained from a client device; and obtaining, based on the queries, the data subsets of the data set that the data request is predicted to seek, wherein generating the one or more subgraphs comprises generating the one or more subgraphs based on the data subsets and the graph data model.

19. The method of embodiment 18, wherein no performance of one or more other queries of the set of queries occurs from the prediction of the data request.

20. The method of any of embodiments 11-19, further comprising: providing the prior queries compatible with the graph data model to a machine learning model to train the machine learning model; obtaining, from the machine learning model, an indication of the prediction of the data request subsequent to the training of the machine learning model; and providing, based on the subsequent data request matching the predicted data request, an indication of the subsequent data request as reference feedback to the machine learning model to further train the machine learning model.

21. A method comprising: obtaining a graph query related to a data request, the graph query comprising patterns; transforming the graph query to a query set based on a graph data model and the patterns of the graph query, the query set comprising queries and query operators linking the queries, the query operators comprising a first query operator linking first and second queries of the queries; predicting, prior to execution of the first and second queries, a satisfiability issue related to combining results derived from the first and second queries; performing, based on the prediction of the satisfiability issue, one or more optimizations on the query set to update the query set; and causing execution of the updated query set to satisfy the graph query.

22. The method of embodiment 21, wherein performing the one or more optimizations comprises removing, based on the prediction of the satisfiability issue, the first query operator from the query set to update the query set such that the updated query set does not include the first query operator.

23. The method of embodiments 22, further comprising: predicting, prior to execution of a subset of queries of the query set, based on the prediction of the satisfiability issue, another satisfiability issue related to combining results derived from the subset of queries, the subset of queries not including the first query or the second query; and removing, based on the prediction of the other satisfiability issue, the second query operator from the query set to update the query set such that the updated query set does not include the second query operator.

24. The method of any of embodiments 21-23, wherein the first query operator comprises a union linking the first and second queries or a join linking the first and second queries.

25. The method of any of embodiments 21-24, wherein predicting the satisfiability issue comprises: determining first and second sources for obtaining results for the first and second queries; determining an incompatibility related to first and second template, the first template being configured for converting data representations from the first source to graph data representations compatible with a graph database, and the second template being configured for converting data representations from the second source to graph data representations compatible with the graph database; and predicting the satisfiability issue based on the incompatibility related to the first and second templates.

26. The method of any of embodiments 21-25, wherein predicting the satisfiability issue comprises: determining, based on the graph data model, a first data type as a data type for storing a first result for the first query in a graph database; determining, based on the graph data model, a second data type as a data type for storing a second result for the second query in the graph database; determining an incompatibility related to the first and second data types; and predicting the satisfiability issue based on the incompatibility related to the first and second data types.

27. The method of embodiments 26, wherein a first data representation corresponding to the first result is stored as a data type in a first source that is compatible with a data type used to store a second data representation corresponding to the second result in a second source.

28. The method of embodiments 26, wherein a first data representation corresponding to the first result is stored as a data type in a first source that is not compatible with a data type used to store a second data representation corresponding to the second result in a second source.

29. The method of any of embodiments 21-28, further comprising: providing graph queries to a machine learning model to cause the machine learning model to predict a given query set for each of the graph queries, at least one of the predicted given query sets comprising predicted queries and predicted query operators linking the predicted queries; providing, with respect to each of the graph queries, a reference query set for the graph query as reference feedback to the machine learning model to cause the machine learning model to assess the predicted given query set against the reference query set, the machine learning model being updated based on the machine learning model's assessment of the predicted given query set; transforming the graph query to the query set by providing the graph query to the machine learning model to obtain the query set; and providing the updated query set to the machine learning model as reference feedback to the machine learning model to cause the machine learning model to assess the query set against the updated query set, the machine learning model being updated based on the machine learning model's assessment of the query set.

30. The method of any of embodiments 21-29, further comprising: provide graph queries or corresponding query sets to a machine learning model to cause the machine learning model to predict one or more given optimizations for each of the corresponding query sets, at least one of the predicted given optimizations comprising removal of a given query operator linking multiple queries from a given query set, merging of multiple queries into a single query, or removal of one or more queries from a given query set; provide, with respect to each of the corresponding query sets, one or more reference optimizations for the corresponding query set as reference feedback to the machine learning model to cause the machine learning model to assess the one or more predicted given optimizations against the one or more reference optimizations, the machine learning model being updated based on the machine learning model's assessment of the one or more predicted given optimizations; providing the graph query or an initial query set derived from the graph query to the machine learning model to obtain one or more optimizations for the initial query set; transforming the graph query to the query set by performing the one or more optimizations on the initial query set; and providing an indication of the removal of the first query operator as to the machine learning model as reference feedback to the machine learning model to cause the machine learning model to assess the one or more optimizations against the removal of the first query operator, the machine learning model being updated based on the machine learning model's assessment of the one or more optimizations.

31. The method of any of embodiments 21-30, further comprising: providing given query sets to a machine learning model to cause the machine learning model to predict one or more satisfiability issues related to each of the given query sets; providing, with respect to each of the given query sets, one or more reference satisfiability issues for the given query set as reference feedback to the machine learning model to cause the machine learning model to assess the one or more predicted satisfiability issues against the one or more reference satisfiability issues, the machine learning model being updated based on the machine learning model's assessment of the one or more predicted satisfiability issues; providing the query set to machine learning model to obtain an indication of the prediction of the satisfiability issue from the machine learning model; and predicting, based in the indication from the machine learning model, the satisfiability issue related to combining results derived from the first and second queries.

32. A tangible, non-transitory, machine-readable medium storing instructions that when executed by a data processing apparatus cause the data processing apparatus to perform operations comprising those of any of embodiments 1-31.

33. A system comprising: one or more processors; and memory storing instructions that when executed by the processors cause the processors to effectuate operations comprising those of any of embodiments 1-31.

What is claimed is:

1. A system for reducing query-related resource usage in a data retrieval process, the system comprising:
   a computer system that comprises one or more central processing units programmed with computer program instructions that, when executed, cause the computer system to:
   obtain a graph query related to a data request, the graph query comprising patterns;
   transform the graph query to a query set based on a graph data model and the patterns of the graph query, the query set comprising queries and query operators linking the queries, the query operators comprising a first query operator linking first and second queries of the queries;
   predict, prior to execution of the first and second queries, a satisfiability issue related to combining results derived from the first and second queries, wherein predicting the satisfiability issue comprises:

determining first and second sources for obtaining results for the first and second queries;
determining an incompatibility related to first and second templates, the first template being configured for converting data representations from the first source to graph data representations compatible with a graph database, and the second template being configured for converting data representations from the second source to graph data representations compatible with the graph database; and
predicting the satisfiability issue based on the incompatibility related to the first and second templates;
remove, based on the prediction of the satisfiability issue, the first query operator from the query set to update the query set such that the updated query set does not include the first query operator; and
cause execution of the updated query set to satisfy the graph query.

2. The system of claim 1, wherein the first query operator comprises a union linking the first and second queries or a join linking the first and second queries.

3. The system of claim 1, wherein predicting the satisfiability issue comprises:
determining, based on the graph data model, a first data type as a data type for storing a first result for the first query in at least one graph database;
determining, based on the graph data model, a second data type as a data type for storing a second result for the second query in the at least one graph database;
determining an incompatibility related to the first and second data types; and
predicting the satisfiability issue based on the incompatibility related to the first and second data types.

4. The system of claim 3, wherein a first data representation corresponding to the first result is stored as a data type in at least one source that is compatible with a data type used to store a second data representation corresponding to the second result in at least one other source.

5. The system of claim 3, wherein a first data representation corresponding to the first result is stored as a data type in at least one source that is not compatible with a data type used to store a second data representation corresponding to the second result in at least one other source.

6. The system of claim 1, wherein the computer system is caused to:
predict, prior to execution of a subset of queries of the query set, based on the prediction of the satisfiability issue, another satisfiability issue related to combining results derived from the subset of queries, the subset of queries not including the first query or the second query; and
remove, based on the prediction of the other satisfiability issue, the second query operator from the query set to update the query set such that the updated query set does not include the second query operator.

7. The system of claim 1, wherein the computer system is caused to:
provide given query sets to a neural network to cause the neural network to predict one or more satisfiability issues related to each of the given query sets;
provide, with respect to each of the given query sets, one or more reference satisfiability issues for the given query set as reference feedback to the neural network to cause the neural network to assess the one or more predicted satisfiability issues against the one or more reference satisfiability issues, the neural network being updated based on the neural network's assessment of the one or more predicted satisfiability issues;
provide the query set to the neural network to obtain an indication of the prediction of the satisfiability issue from the neural network; and
predict, based in the indication from the neural network, the satisfiability issue related to combining results derived from the first and second queries.

8. A method of reducing query-related resource usage in a data retrieval process, the method being implemented by a computer system that comprises one or more central processing units executing computer program instructions that, when executed, perform the method, the method comprising:
obtaining a graph query related to a data request, the graph query comprising patterns;
transforming the graph query to a query set based on a graph data model and the patterns of the graph query, the query set comprising queries and query operators linking the queries, the query operators comprising a first query operator linking first and second queries of the queries;
predicting, prior to execution of the first and second queries, a satisfiability issue related to combining results derived from the first and second queries, wherein predicting the satisfiability issue comprises:
determining, based on the graph data model, a first data type as a data type for storing a first result for the first query in a graph database;
determining, based on the graph data model, a second data type as a data type for storing a second result for the second query in the graph database;
determining an incompatibility related to the first and second data types; and
predicting the satisfiability issue based on the incompatibility related to the first and second data types;
removing, based on the prediction of the satisfiability issue, the first query operator from the query set to update the query set such that the updated query set does not include the first query operator; and
causing execution of the updated query set to satisfy the graph query.

9. The method of claim 8, wherein the first query operator comprises a union linking the first and second queries or a join linking the first and second queries.

10. The method of claim 8, wherein predicting the satisfiability issue comprises:
determining, based on the graph data model, a first data type as a data type for storing a first result for the first query in at least one graph database;
determining, based on the graph data model, a second data type as a data type for storing a second result for the second query in the at least one graph database;
determining an incompatibility related to the first and second data types; and
predicting the satisfiability issue based on the incompatibility related to the first and second data types.

11. The method of claim 10, wherein a first data representation corresponding to the first result is stored as a data type in at least one source that is compatible with a data type used to store a second data representation corresponding to the second result in at least one other source.

12. The method of claim 10, wherein a first data representation corresponding to the first result is stored as a data type in at least one source that is not compatible with a data type used to store a second data representation corresponding to the second result in at least one other source.

13. The method of claim 8, further comprising:
predicting, prior to execution of a subset of queries of the query set, based on the prediction of the satisfiability issue, another satisfiability issue related to combining results derived from the subset of queries, the subset of queries not including the first query or the second query; and
removing, based on the prediction of the other satisfiability issue, the second query operator from the query set to update the query set such that the updated query set does not include the second query operator.

14. The method of claim 8, further comprising:
providing given query sets to a neural network to cause the neural network to predict one or more satisfiability issues related to each of the given query sets;
providing, with respect to each of the given query sets, one or more reference satisfiability issues for the given query set as reference feedback to the neural network to cause the neural network to assess the one or more predicted satisfiability issues against the one or more reference satisfiability issues, the neural network being updated based on the neural network's assessment of the one or more predicted satisfiability issues;
providing the query set to the neural network to obtain an indication of the prediction of the satisfiability issue from the neural network; and
predicting, based in the indication from the neural network, the satisfiability issue related to combining results derived from the first and second queries.

15. One or more non-transitory machine-readable media storing instructions configured to be executed by one or more central processing units of a data processing apparatus such that the stored instructions, when executed, by a data processing apparatus cause the data processing apparatus to perform operations comprising:
obtaining a graph query related to a data request, the graph query comprising patterns;
transforming the graph query to a query set based on a graph data model and the patterns of the graph query, the query set comprising queries and query operators linking the queries, the query operators comprising a first query operator linking first and second queries of the queries;
predicting, prior to execution of the first and second queries, a satisfiability issue related to combining results derived from the first and second queries, wherein predicting the satisfiability issue comprises:
determining, based on the graph data model, a first data type as a data type for storing a first result for the first query in a graph database;
determining, based on the graph data model, a second data type as a data type for storing a second result for the second query in the graph database;
determining an incompatibility related to the first and second data types; and
predicting the satisfiability issue based on the incompatibility related to the first and second data types;
removing, based on the prediction of the satisfiability issue, the first query operator from the query set to update the query set such that the updated query set does not include the first query operator; and
causing execution of the updated query set to satisfy the graph query.

16. The one or more non-transitory machine-readable media of claim 15, wherein the first query operator comprises a union linking the first and second queries or a join linking the first and second queries.

17. The one or more non-transitory machine-readable media of claim 15, wherein predicting the satisfiability issue comprises:
determining, based on the graph data model, a first data type as a data type for storing a first result for the first query in at least one graph database;
determining, based on the graph data model, a second data type as a data type for storing a second result for the second query in the at least one graph database;
determining an incompatibility related to the first and second data types; and
predicting the satisfiability issue based on the incompatibility related to the first and second data types.

18. The one or more non-transitory machine-readable media of claim 17, wherein a first data representation corresponding to the first result is stored as a data type in at least one source that is compatible with a data type used to store a second data representation corresponding to the second result in at least one other source.

19. The one or more non-transitory machine-readable media of claim 17, wherein a first data representation corresponding to the first result is stored as a data type in at least one source that is not compatible with a data type used to store a second data representation corresponding to the second result in at least one other source.

20. The one or more non-transitory machine-readable media of claim 15, the operations further comprising:
predicting, prior to execution of a subset of queries of the query set, based on the prediction of the satisfiability issue, another satisfiability issue related to combining results derived from the subset of queries, the subset of queries not including the first query or the second query; and
removing, based on the prediction of the other satisfiability issue, the second query operator from the query set to update the query set such that the updated query set does not include the second query operator.

* * * * *